US008018097B2

(12) United States Patent
Saito et al.

(10) Patent No.: US 8,018,097 B2
(45) Date of Patent: Sep. 13, 2011

(54) SWITCHING CONTROL SYSTEM OF CIRCUIT BREAKER

(75) Inventors: Minoru Saito, Kanagawa (JP); Hiroyuki Maehara, Tokyo (JP); Shiro Maruyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 63 days.

(21) Appl. No.: 12/443,980

(22) PCT Filed: Oct. 2, 2007

(86) PCT No.: PCT/JP2007/001074

§ 371 (c)(1), (2), (4) Date: Jan. 29, 2010

(87) PCT Pub. No.: WO2008/041368

PCT Pub. Date: Apr. 10, 2008

(65) Prior Publication Data

US 2010/0141050 A1 Jun. 10, 2010

(30) Foreign Application Priority Data

Oct. 2, 2006 (JP) ................................ 2006-270796

(51) Int. Cl.
*H02B 1/24* (2006.01)

(52) U.S. Cl. ....................................................... 307/112

(58) Field of Classification Search .................. 307/112, 307/116, 125, 141; 361/115
See application file for complete search history.

(56) References Cited

U.S. PATENT DOCUMENTS 6,172,863 B1 * 1/2001 Ito et al. .......................... 361/79
6,198,402 B1 3/2001 Hasegawa et al.

FOREIGN PATENT DOCUMENTS

| | | |
|---|---|---|
| JP | 03 156820 | 7/1991 |
| JP | 6 203688 | 7/1994 |
| JP | 11 299074 | 10/1999 |
| JP | 2000 207982 | 7/2000 |
| JP | 2003 79072 | 3/2003 |
| JP | 2005 73478 | 3/2005 |

OTHER PUBLICATIONS

Controlled Switching Buyer's Guide , Edition 1, May 2004, ABB Power Technologies.
"Controlled Switching Of HVAC Circuit Breakers Guide For Application Lines, Reactors, Capacitors, Transformers ($1^{st}$ Part)", ELECTRA No. 183, pp. 43-73, (1999).

* cited by examiner

*Primary Examiner* — Jared Fureman
*Assistant Examiner* — Carlos Amaya
(74) *Attorney, Agent, or Firm* — Oblon, Spivak, McClelland, Maier & Neustadt, L.L.P.

(57) ABSTRACT

A switching control system of circuit breaker, including at least: one switching control unit per circuit breaker, each of which inputs electrical quantity of power system voltage and main circuit current, state quantity of a circuit breaker, and an opening command signal or closing command signal of the circuit breaker, and performs control to cause the circuit breaker to open or close at a desired phase of the power system voltage or main circuit current; and a display operation unit connected with the switching control unit via a communication network and performs display operation to operate and monitor the operation and state of the switching control unit of circuit breaker. The switching control unit includes a first area for causing the circuit breaker to open or close at a desired phase of the power system voltage or current; and a second area for transmitting/receiving information via the communication network.

14 Claims, 17 Drawing Sheets

SWITCHING CONTROL SYSTEM OF CIRCUIT BREAKER

TECHNICAL FIELD

The present invention relates to a switching control system of circuit breaker, and more particularly to a switching control system of circuit breaker which prevents transient phenomena that impact electric power systems and electric power equipment by controlling the opening or closing timing of the circuit breaker.

BACKGROUND ART

A method for suppressing the generation of transient phenomena, which impact electric power systems and electric power equipment, by controlling the opening or closing timing of a circuit breaker for power, has been proposed (e.g. see Non-patent Document 1).

A specific invention to implement this method for suppressing the generation of transient phenomena, which has already been proposed, is a switching controlgear of circuit breaker which switches a circuit breaker contact at a timing between a current zero point and a peak value of the circuit breaker current when current is interrupted, and controls the closing timing of the circuit breaker contact according to the type of load when the circuit breaker contact is closed (e.g. see Patent Document 1).

Such a switching controlgear of circuit breaker has already been used in many actual electric stations (see Non-patent Document 1).

All of the switching controlgear of circuit breakers according to Patent Document 1 have a function to delay the output timing of an opening command signal or closing command signal to the circuit breaker, so that the circuit breaker can interrupt or not interrupt at a predetermined phase when the opening command signal or closing command signal is detected. Such a switching control for a circuit breaker is called “synchronous opening control” or “synchronous closing control”.

Patent Document 1: Japanese Patent Application Laid-Open No. H3-156820

Non-patent Document 1: Catalogue publication 1HSM 9543 22-01en, Controlled Switching Buyer’s Guide Edition 1, 2004-05, ABB Power Technologies Many of the switching controlgear of circuit breakers applied to electric stations have a means for connecting with external equipment, such as a personal computer (hereafter PC), and has a function to acquire various data, including main circuit current waveforms and power system voltage waveforms when the switching control of the circuit breaker is performed.

In order to connect the synchronous switching control device of a circuit breaker and an external equipment, such as a PC, however, dedicated communication software and maintenance software must be installed on the PC in advance.

In the case of the switching controlgear of circuit breaker shown in Non-patent Document 1, for example, dedicated communication software and maintenance software are provided to the user via CD-ROM. In this case, the user must install the dedicated software written on the CD-ROM on a PC using a CD-ROM driver. Therefore the PC, in which the dedicated software is not installed, cannot be connected to the switching controlgear of circuit breaker, which is inconvenient, especially in terms of storing and managing various acquired data. Also in the switching controlgear of circuit breaker shown in Non-patent Document 1, a serial communication standard cable, RS-232C, is used to connect with a PC, and the maximum length of the RS-232C cable is about 15 m.

Therefore in the case of the switching controlgear of circuit breaker shown in Non-patent Document 1, connection with a PC is normally a local connection at the work site, which is not convenient for remote control. If remote control is required, [the switching controlgear of circuit breaker] must be connected using a modem via a telephone line, for example, instead of an RS-232C cable, which is not only inconvenient but also has a slow communication speed and poor work efficiency.

Also only one switching controlgear of circuit breaker can be connected to one PC at a time, which means that a switching operation is required to perform maintenance and various data collection for the switching controlgear of circuit breakers installed in a plurality of circuits, which has poor work efficiency.

DISCLOSURE OF THE INVENTION

With the foregoing in view, it is an object of the present invention to provide a switching controlgear of circuit breaker which can easily connect with such an external equipment as a PC, both at the work site and remote side, without using dedicated software, and can implement efficient maintenance and data collection.

It is a second object of the present invention to provide a switching controlgear of circuit breaker which does not cause a malfunction or non-operation of a circuit breaker by a single abnormality of the switching controlgear of circuit breaker.

It is a third object of the present invention to provide an economical and high functioning switching controlgear of circuit breaker which can contribute to energy saving during circuit breaker maintenance, and an easy and quick handling of accidents, by integrating a circuit breaker monitoring function (gas pressure, contact erosion quantity calculation, circuit breaker operation time), can improve operability of the circuit breaker and system, and thereby improve cost of the entire facility.

To achieve the above objects, the present invention provides a switching control system of circuit breaker comprising: one or more switching control units of circuit breaker each of which inputs electrical quantity of at least one of power system voltage and main circuit current, the state quantity of a circuit breaker, and at least one of an opening command signal and closing control signal of the circuit breaker, and performs control to cause the circuit breaker to open or close at a desired phase of the power system voltage or main circuit current; and a display operation unit, which is connected with the switching control unit of circuit breaker via a communication network, and performs the display operation to operate and monitor the operation and state of the switching control unit of circuit breaker, characterized in that the switching control unit of circuit breaker has the following technical characteristics.

That is, in the switching control system of circuit breaker of the present invention, the switching control unit of circuit breaker comprises: a first area serving as switching control arithmetic operation means for causing the circuit breaker to open or close at a desired phase of the power system voltage or main circuit current; and a second area serving as communication arithmetic operation means for transmitting/receiving information from the display operation unit or transmitting information of the first area via the communication network, wherein the switching control arithmetic operation of the first area can be executed independently from the communication arithmetic operation of the second area for the communication network by disposing information transfer means between the first area and the second area, and the switching control unit of circuit breaker further comprises: a third area serving as switching command control means, which is connected to the first area via a parallel transmission medium, and outputs a delay-controlled opening command signal or a delay-controlled closing command signal to the circuit breaker based on a switching control arithmetic operation result of the first area; a semiconductor switch circuit for circuit breaker switching control in which a plurality of semiconductor switches for circuit breaker switching control are connected, in order to output a delay-controlled opening command signal or a delay-controlled closing command signal to the circuit breaker in the third area; a bypass circuit which is connected in parallel with the semiconductor switch circuit for circuit breaker switching control; and a bypass circuit selector switch which prevents current from simultaneously flowing into the semiconductor switch circuit for circuit breaker switching control and the bypass circuit, wherein the bypass circuit selector switch selects the bypass circuit side when an abnormality is detected in the switching control unit of circuit breaker, or when a bypass circuit change-over command signal from the outside is input.

According to the present invention, a switching control unit of circuit breaker, which can easily acquire and store synchronous switching control related data from a switching control unit of circuit breaker in a remote site via a communication network by having display/operation/data processing software, which is installed and operates in a display operation unit constructed by a general purpose computer, function as a human interface (HMI), can be provided.

EXPLANATION OF REFERENCE NUMERALS

Figure 1:
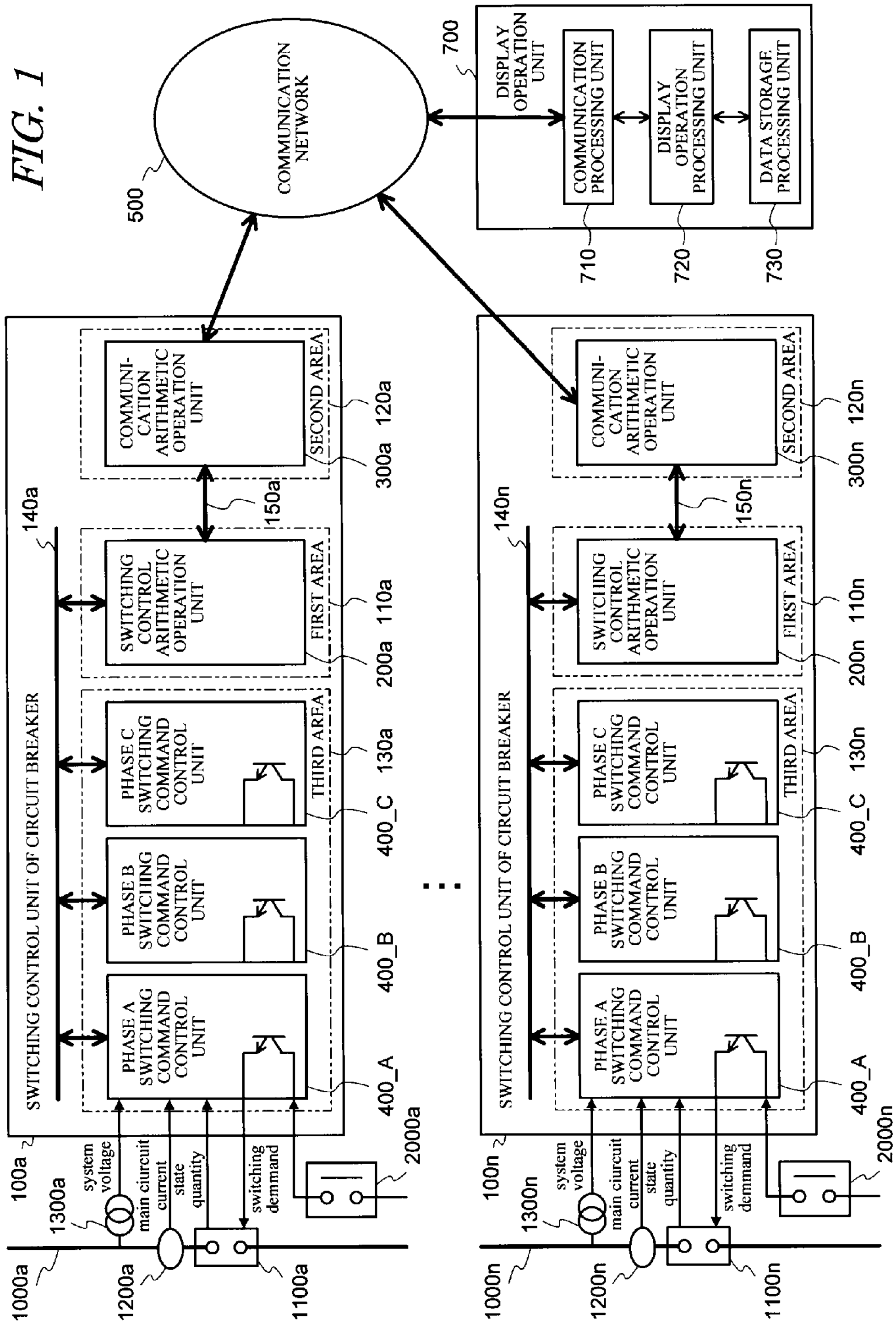
FIG. 1 is a diagram depicting a system configuration of a switching control system of circuit breaker according to Embodiment 1 of the present invention.

100: switching control unit of circuit breaker
110: first area
120: second area
130: third area
140: parallel transmission medium
200: switching control arithmetic operation unit of switching control unit of circuit breaker
213: reignition detection processing (reignition detection function)
214: contact erosion quantity calculation processing (contact erosion quantity calculation function)
215: circuit breaker state quantity monitoring processing (circuit breaker state quantity monitoring function)
300: communication arithmetic operation unit of switching control unit of circuit breaker
400: switching command control unit of switching control unit of circuit breaker
10: switching command output unit
20: hardware-based delay time counter
30: DPRAM
40: communication interface
500: communication network
60: bypass circuit of switching control unit of circuit breaker
600: power circuit of switching control unit of circuit breaker
610: backup battery of switching control unit of circuit breaker
700: display operation unit
50: wireless communication means of communication arithmetic operation unit of switching control unit of circuit breaker
800: web server installed in communication arithmetic operation unit of switching control unit of circuit breaker
810: web browser installed in display operation unit

BEST MODE FOR CARRYING OUT THE INVENTION

Embodiments of the switching control system of circuit breaker according to the present invention will now be described with reference to the drawings.

Embodiment 1

Embodiment 1 of the present invention will be described with reference to the diagram depicting the switching control system of circuit breaker in FIG. 1, the detailed block diagram of the switching control unit of circuit breaker 100 in FIG. 2, and the timing chart of synchronous opening control in FIG. 3.

(Configuration)

First the switching control system of circuit breaker in FIG. 1 will be described.

100*a* to 100*n* are switching control units of circuit breaker, 500 is a communication network, and 700 is a display operation unit, and these are major components of the switching control system of circuit breaker.

1000*a* to 1000*n* are the main circuits of the electric power system, 1100*a* to 1100*n* are the circuit breakers installed in the main circuits 1000*a* to 1000*n*, 1200*a* to 1200*n* are the current transformers (CT) which transform main circuit current and output, and 1300*a* to 1300*n* are the voltage transformers (VT or PD) which transform the power system voltage and output. It is assumed that general equipment constituting the switchgear of an electric-supply station are connected to the main circuits 1000*a* to 1000*n*, although a disconnecting switch, earth switch or the like are omitted.

In FIG. 1, [the system] for only one phase is illustrated, but the present invention operates and functions in a three-phase circuit breaker and in other circuits, and in the following description, the target [of the present invention] is assumed to be a three-phase circuit or three-phase circuit breaker, unless otherwise specified.

2000*a* to 2000*n* are higher-ranking devices, such as a protective relay device and BCU (Bay Control Unit).

In the drawings, the subscripts "a" to "n" indicate circuits "a" to "n", and are omitted herein below unless special description is necessary. The circuits a to n may be different circuits in a same electric station or different circuits in different electric stations, and the circuits can be all the circuits in an electric-supply station, including a power transmission line circuits, transformer circuit, reactor circuit and capacitor bank circuit.

Now the three major components constituting the switching control system of circuit breaker, that is, a switching control unit of circuit breaker 100, communication network 500 and display operation unit 700, will be described in detail.

<Switching Control Unit of Circuit Breaker 100>

The switching control unit of circuit breaker 100 is comprised of three major areas. The first area is a first area 110 in which the switching control arithmetic operation is performed for causing the circuit breaker 1100 to open or close at a desired phase of the power system voltage or major circuit current, the second area is a second area 120 in which information from the display operation unit 700 is transmitted/received or information on the first area 110 is transmitted via the communication network 500, and the third area is a third area 130 in which a delay-controlled opening command signal or a delay-controlled closing command signal is output to the circuit breaker based on the switching control arithmetic operation result of the first area 110.

The first area 110 of the switching control unit of circuit breaker 100 is actually a switching control arithmetic operation unit (switching control arithmetic operation means) 200 constructed by a substrate of which major composing element is a switching control operation MPU (MicroProcessor Unit). The second area 120 of the switching control unit of circuit breaker 100 is actually a communication arithmetic operation unit (communication arithmetic operation means) 300 constructed by a substrate of which major composing element is a communication operation MPU (MicroProcessor Unit), and a communication I/F (interface).

The third area 130 of the switching control unit of circuit breaker 100 is actually switching command control units (switching command control means) 400_A, 400_B and 400_C constructed by a substrate of which major composing elements are an AC input circuit, sensor input circuit, DI (digital) input circuit, and switching command output unit. Here the subscripts _A, _B and _C indicate Phase A, Phase B and Phase C respectively, and in the present embodiment, the switching command control units 400_A, 400_B and 400_C are the composing elements independent in each phase, that is, independent substrates for each phase. However in terms of function, needless to say, one substrate may be used as a three-phase integrated switching command control unit. In the following description, the subscripts _A, _B and _C are omitted unless description distinguishing phase A, phase B and phase C is especially necessary.

Now the connection relationship of the first area 110, second area 120 and third area 130 of the switching control unit of circuit breaker 100 will be described.

The second area 120 of the switching control unit of circuit breaker 100, that is the communication arithmetic operation unit 300, is directly connected to the communication network 500. On the other hand, the first area 110 and the third area 130, that is the switching control arithmetic operation unit 200 and the switching command control unit 400, are not directly connected to the communication network 500. The first area and the second area are connected via a transmission medium 150 so as to transmit/receive data between the respective MPUs. The first area 110 and the third area 130 are connected via a parallel transmission medium 140, which is an I/O bus for mutually communicating AC input, sensor input, digital input a switching command signal and other data.

The switching control unit of circuit breaker 100 will be described in more detail with reference to the detailed block diagram of the switching control unit of circuit breaker 100 in FIG. 2.

The switching control arithmetic operation unit 200 of the first area 110 is comprised of a switching control operation MPU (MicroProcessor Unit) 210, RAM 230, flash ROM (or erasable non-volatile memory, such as EEPROM) 240, DPRAM (dual port RAM) 30, and I/O bus interface 290, and these composing elements are interconnected via a local bus 220.

The local bus 220 is a dedicated parallel bus of the hardware to be used, or such a general purpose parallel bus as a PCI bus, compact PCI bus and VME bus. The I/O bus interface 290 is an interface of a parallel transmission medium 140, which is an I/O bus to communicate data between the first area 110 and the third area 130.

The communication arithmetic operation unit 300 of the second area 120 is comprised of a communication operation MPU (MicroProcessor Unit) 310, RAM 330, flash ROM (or erasable non-volatile memory, such as EEPROM) 340, and communication interface 40, and these composing elements are interconnected via a local bus 320.

The local bus 320 is a dedicated parallel bus of the hardware to be used, or such a general purpose parallel bus as a PCI bus, compact PCI bus and VME bus. The communication interface 40 is an interface to connect to the communication network 500. In FIG. 2, the MPU for communication operation 310 and the communication interface 40 are connected via the local bus 320, but may be connected via a dedicated local bus.

The switching control operation MPU 210 in the switching control arithmetic operation unit 200 and the communication operation MPU 310 in the communication arithmetic operation unit 300 are interconnected via a transmission medium 150 in order to transmit/receive data between each other. The transmission medium 150 is constructed by connecting the local bus 220 of the switching control arithmetic operation unit 200 and the local bus 320 of the communication arithmetic operation unit 300 via the DPRAM 30.

Figure 2:
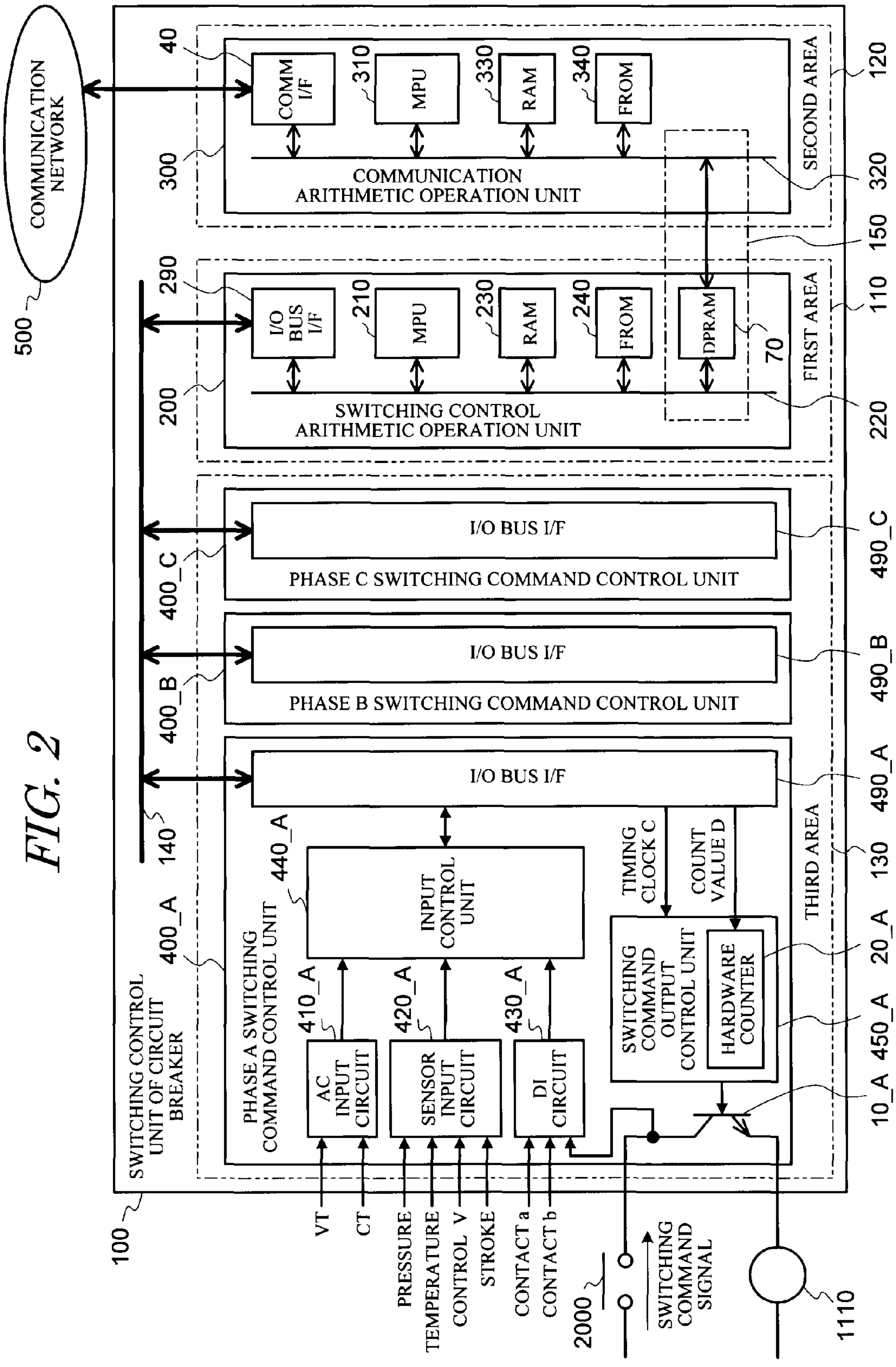
FIG. 2 is a detailed block diagram depicting a switching control unit of circuit breaker according to Embodiment 1 of the present invention.

In the configuration in FIG. 2, the DPRAM 30 is disposed in the switching control arithmetic operation unit 200, but needless to say, the DPRAM 30 may be disposed in the communication arithmetic operation unit 300. As the transmission medium 150, a dedicated parallel bus using a PCI bus, compact PCI bus or VME bus, or a dedicated serial bus, may be used instead of DPRAM.

The switching command control unit 400 of the third area 130 is comprised of an AC input circuit 410, sensor input circuit 420, DI circuit 430, input control unit 440, switching command output control unit 450, switching command output unit 10 and I/O bus interface 490. The configurations of the switching command control units 400_A, 400_B and 400_C for phase A, phase B and phase C are identical.

A main circuit current signal or power system voltage signal, for example, is input from a current transformer 1200 or voltage transformer 1300 to the AC input circuit 410, and a pressure signal from an operation pressure sensor for measuring the state quantity of the circuit breaker, a temperature signal from a temperature sensor, a stroke signal from a stroke sensor and control voltage of the circuit breaker are input to the sensor input circuit 420.

The AC input circuit 410 and sensor input circuit 420 are comprised of an insulation circuit, analog filter (normally low pass filter), sampling hold circuit, multiplexer and analog-digital converter, for example, and receive the main circuit current signal, power system voltage signal and sensor signal, such as pressure, as analog information, hold the signals with a predetermined sampling interval, and convert them into digital quantity.

A circuit configuration in which an analog-digital converter is installed for each input signal may be used, omitting the sampling hold circuit and multiplexer, or an analog-digital converter enclosing a sampling hold circuit may be used. It is not always necessary to input all the electrical quantities shown in the present embodiment, such as the main circuit current signal, power system voltage signal and pressure, and needless to say, the input circuit configuration can be changed according to the control algorithm to be used.

Contact a and contact b of the circuit breaker, which are the state quantities of the circuit breaker, the circuit breaker switching command signal from such a higher-ranking device 2000 as a protective relay device and BCU, and other digital signals are input to the DI (Digital) input circuit 430, and an unillustrated sampling hold circuit holds the digital input quantities at a predetermined sampling interval, and loads the digital quantities.

The input control unit 440 is comprised of such a logical circuits as a PLD (Programmable Logical Device) or an FPGA (Field Programmable Gate Array). This input control unit 440 controls the operation timings of the sampling hold circuit of the AC input circuit 410, sensor input circuit 420 and DI circuit 430, multiplexer, and analog-digital converter, and controls the data transmission to send such digital quantities as the main circuit current signal, power system voltage signal, sensor signal such as for pressure, contact a and contact b of the circuit breaker, and a switching command signal, to the switching control arithmetic operation unit 200 via the I/O bus interface 490 and parallel transmission medium 140.

The switching command output control unit 450 is such a logical circuit as a PLD (Programmable Logical Device) or an FPGA (Field Programmable Gate Array), and encloses a hardware counter 20. [The switching command output control unit 450] receives a synchronization delay count value D (this synchronization delay count value D will be described later) and timing clock C, which are sent from the switching control arithmetic operation unit 200 via the I/O bus interface 490, executes a predetermined synchronization delay counter control, and outputs a trigger signal to a switching command output unit 10.

In the configuration in FIG. 2, the hardware counter 20 is enclosed in the switching command output control unit 450, but the hardware counter 20 can be omitted depending on the control algorithm to be used.

The switching command output unit 10 is normally a semiconductor switch, such as an FET and IGBT, and the semiconductor switch is turned ON by a trigger signal from the switching command output control unit 450. When this switching command output unit 10 turns ON, the circuit breaker switching command signal (circuit breaker drive current) under synchronous switching control flows into a circuit breaker drive coil 1110, and the circuit breaker opens or closes.

The I/O bus interface 490 is an interface of the parallel transmission medium 140, which is an I/O bus for mutually communicating data between the first area 110 and the third area 130.

For the parallel transmission medium 140, a general purpose parallel bus, such as a PCI bus, compact PCI bus and VME bus, may be used, or a dedicated parallel bus of the hardware to be used may be used. In the case of a dedicated parallel bus, the synchronization delay count value D and the timing clock C may be transmitted/received via a dedicated line.

As a variant form of the configuration of the switching control unit of circuit breaker 100, the function and configuration of the third area 130 may be enclosed in the first area 110, since the same function and effect can be implemented in this configuration as well. Enclosing the function and configuration of the third area 130 in the first area 110 means integrating the functions and configurations of the switching control arithmetic operation unit 200 and the switching command control units 400_A, 400_B and 400_C into one substrate. In this case, all the processings corresponding to the functions of the first area 110 and the third area 130 may be processed by one MPU, or the functions may be processed by an independent MPU for each phase, or a combination of independent MPUs for each phase and an MPU for integrating the MPUs for each phase may be used for processing.

As another variant form of the configuration of the switching control unit of circuit breaker 100, all or a part of the parallel transmission medium 140 may be replaced with a serial transmission medium.

<Communication Network 500>

The communication network 500 will now be described in detail.

A configuration example of the communication network 500 is a communication network which connects the switching control units of circuit breaker 100*a* to 100*n* and the display operation unit 700 in a local range, such as an electric station, via a LAN. In the communication network 500, connection using a twisted pair cable of 10BASE-T or 100BASE-TX, or connection using such an optical fiber as 100BASE-FX, is used, although this is not illustrated, and the switching control units 100*a* to 100*n* and the display operation unit 700 are interconnected via such a hub as a switching hub or repeater.

One switching control unit 100 and the display operation unit 700 may be connected one-to-one using a cross cable for the connection media. The configuration of the LAN is a generally known, for which detailed description is omitted.

<Display Operation Unit 700>

Now the display operation unit 700 will be described in detail.

The display operation unit 700 is comprised of a communication processing unit 710, display arithmetic operation unit 720 and data storage processing unit 730. In concrete terms, the display operation unit 700 can be implemented by a general purpose computer, such as a PC or workstation.

The communication processing unit 710 is comprised of a LAN interface circuit of a general purpose computer and LAN communication software.

The display arithmetic operation unit 720 is comprised of display/operation/data processing software which runs on the CPU of a general purpose computer, and such a display device as a monitor.

The data storage processing unit 730 is comprised of data storage software which runs on the CPU of a general purpose computer, and such an external storage device as a hard disk and CD-ROM.

The display operation unit software, such as LAN communication software, display/operation/data processing software and data storage software which run on a general purpose computer, normally must be developed as dedicated software according to the hardware configuration and operating system of the computer to be used, and related software, but commercially available software may be used for some modules.

As described above, the display operation unit 700 can be implemented by installing the display operation unit software on a general purpose computer that satisfies the required operation conditions, such as a LAN interface circuit, CPU on which display operation unit software can run, and an external storage device such as a hard disk. In the present embodiment, it is assumed that a general purpose computer, in which the display operation unit software is installed, is used as the display operation unit 700, herein below, unless otherwise specified.

Although this is not illustrated, a plurality of display operation units 700 may be constructed in an electric station by installing display operation unit software in a plurality of general purpose computers of the electric station respectively. In this case, the plurality of display operation units 700 and the plurality of switching control units of circuit breaker 100*a* to 100*n* can be interconnected via the communication network 500.

Needless to say, the display operation unit 700 may be implemented by dedicated hardware so that the communication processing unit 710, display arithmetic operation unit 720 and data storage processing unit 730 may be constructed as software which runs on this dedicated hardware.

(Function)

A concrete synchronous switching control operation of the switching control system of circuit breaker according to the present embodiment will now be described.

To perform synchronous switching control for opening or closing the contact of the circuit breaker 1100 at a predetermined phase of the main circuit current or power system voltage, the circuit breaker switching command signal from the higher-ranking device 2000, such as a protective relay device and BCU, is input to the switching command control unit 400 of the switching control unit of circuit breaker 100. Then the semiconductor switch of the switching command output unit 10 turns ON when a predetermined delay time is elapsed, and the switching command signal (circuit breaker drive current) after synchronous switching control is performed is output to the circuit breaker drive coil 1110.

This predetermined delay time corresponds to the above mentioned synchronization delay count value D, and is calculated by the switching control operation MPU 210 of the switching control arithmetic operation unit 200 based on the main circuit current or power system voltage acquired by the switching command control unit 400. The synchronization delay count value D calculated by the switching control operation MPU 210 is sent to the parallel transmission medium 140, which is an I/O bus, from the I/O bus interface 290 of the switching control arithmetic operation unit 200, and is sent to the switching command output control unit 450 of the switching command control unit 400 via the parallel transmission medium 140. When the switching command signal is synchronous-controlled and output to the circuit breaker 1100, the hardware counter 20 of the switching command output control unit 450 counts this synchronization delay count value D, so that the semiconductor switch of the switching command output unit 10 turns ON at a predetermined timing.

An example of the calculation algorithm of the synchronization delay count value D by the switching control operation MPU 210 will now be described with reference to the timing chart of the synchronous opening control in FIG. 3.

Figure 3:
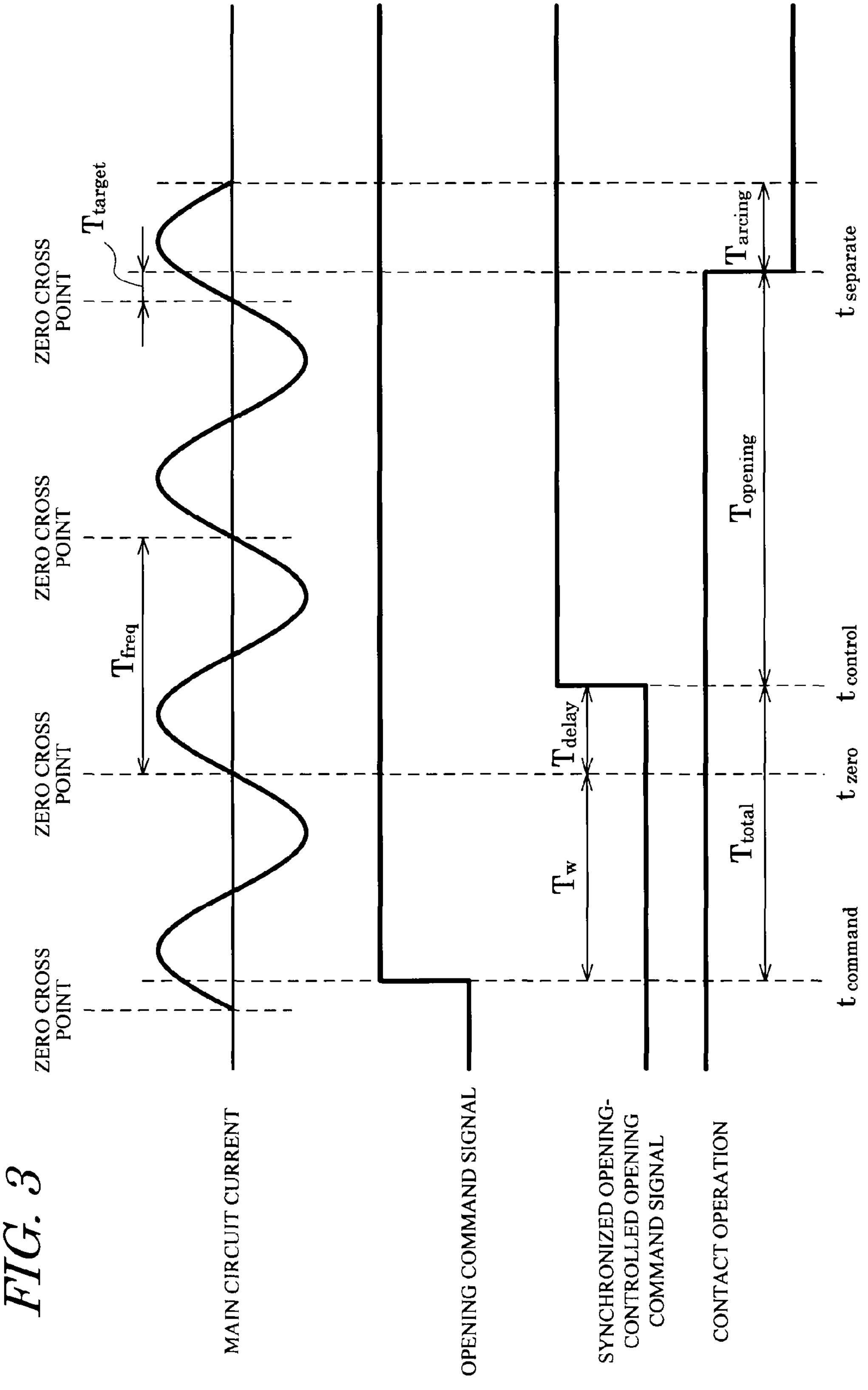
FIG. 3 is a timing chart depicting synchronous opening control according to Embodiment 1 of the present invention.

Definitions of the symbols in FIG. 3 are as follows.

$T_w$: zero cross point wait time $T_{delay}$: synchronous opening delay time $T_{target}$: time from zero cross point to target opening phase ($T_{target}<T_{freq}$)

$T_{opening}$: opening operation time $T_{freq}$: system cycle $T_{arcing}$: arc time $T_{total}$: total wait time from opening command signal input to opening command signal output $t_{command}$: opening command signal input timing $t_{zero}$: timing of next zero cross point after opening command signal is input $t_{control}$: opening command signal output timing $t_{separate}$: target opening phase (opening timing of contact)

The opening command signal is input from the higher-ranking device 2000, such as the protective relay device and BCU, to the switching command control unit 400 of the switching control unit of circuit breaker 100 at the opening command signal input timing $t_{command}$.

After the opening command signal is received, the switching control operation MPU 210 of the switching control arithmetic operation unit 200 waits for the timing of the next zero cross point $t_{zero}$ of the main circuit current, and calculates the synchronous opening delay time $T_{delay}$, assuming that the circuit breaker 1100 opens at a predetermined phase of the main circuit current if the synchronized opening-controlled opening command signal is output to the circuit breaker 1100 at the opening command signal output timing $t_{control}$ when the synchronous opening delay time $T_{delay}$ is elapsed from the timing of this zero cross point $t_{zero}$.

Ideally the synchronous opening delay time $T_{delay}$ is given by the following expression using the time $T_{target}$ from the zero cross point to the target opening phase (contact opening timing) $t_{separate}$, the opening operation time $T_{opening}$ and system cycle $T_{freq}$.

$$T_{delay}=T_{freq}+(T_{target}-(T_{opening}\%\ T_{freq}))$$

$$(T_{target}<T_{freq}, 0\leq T_{delay}<2\times T_{freq})$$

Here ($T_{opening}\%\ T_{freq}$) is a remainder of $T_{opening}/T_{freq}$.

The switching control unit of circuit breaker 100 performs synchronous opening control where the switching control arithmetic operation unit 200 and switching command control unit 400 play the following roles respectively.

<Role of Switching Control Arithmetic Operation Unit 200>

(i) The timing of the zero cross point of the main circuit current is detected. The main circuit current waveform is acquired from the switching command control unit 400 via the parallel transmission medium 140, which is an I/O bus.

(ii) After the opening command signal is received at the opening command signal input timing $t_{command}$, the zero cross point wait time $T_w$ from this opening command signal input timing $t_{command}$ to the timing of the next zero cross point of the main circuit current $t_{zero}$ is calculated.

(iii) Based on the timing of the zero cross point of the main circuit current $t_{zero}$, the synchronous zero, opening delay time $T_{delay}$ from this timing of the zero cross point $t_{zero}$ to the opening command signal output timing $t_{control}$ of the circuit breaker after the synchronous opening control is calculated.

In FIG. 3, $T_{total}$ indicates the total wait time from the opening command signal input timing $t_{command}$ to the opening command signal output timing $t_{control}$ of the circuit breaker after the synchronous opening control.

(iv) The synchronous opening delay time $T_{delay}$ is converted into the synchronization delay count value D which the hardware counter 20 of the switching command output control unit 450 can count.

Here it is assumed that the switching control operation MPU 210 of the switching control arithmetic operation unit 200 and the switching command output control unit 450 of the switching command control unit 400 are operating with a common timing clock C. In the conversion processing from the synchronous opening delay time $T_{delay}$ to the synchronization delay count value D, the count value is corrected first so as to be a value based on the rise timing of this common timing clock C, and is then converted into the synchronization delay count value D. In addition, correction is performed on an ideal synchronous opening delay time, that is, an ideal synchronization delay count value, considering the transmission delay in the switching command output control unit 450, and the shift between the actual zero cross point and the zero cross point that is recognized by the switching control operation MPU 210.

The synchronous opening delay time may be roughly counted by the software counter, which is executed by the switching control operation MPU 210, and the remaining time may be calculated as the synchronization delay count value D.

(v) The synchronization delay count value D is transferred to the switching command output control unit 450 via the parallel transmission medium 140, which is an I/O bus.

<Role of Switching Command Control Unit 400>

(i) The switching command output control unit 450 constantly receives the common timing clock C from the switching control arithmetic operation unit 200 via the parallel transmission medium 140, which is an I/O bus, and operates based on this common timing clock C.

(ii) When the switching command output control unit 450 receives the synchronization delay count value D from the switching control arithmetic operation unit 200 via the parallel transmission medium 140, which is an I/O bus, the hardware counter 20 of the switching command output control unit 450 counts the delay timer for the received synchronization delay count value D.

(iii) After counting of the delay timer completes, the switching command output control unit 450 outputs a trigger signal to the semiconductor switch of the switching command output unit 10.

(iv) When the semiconductor switch of the switching command output unit 10 is turned ON by this trigger signal, the opening command signal of the circuit breaker (circuit breaker drive current) after the synchronous opening control, flows into the opening drive coil 1110 of the circuit breaker, and the circuit breaker performs the opening operation.

The opening operation time $T_{opening}$ of the circuit breaker from the opening command signal output timing $t_{control}$ of the circuit breaker after the synchronous opening control to the target opening phase $t_{separate}$ changes depending on the circuit breaker temperature, circuit breaker operation pressure, circuit breaker control voltage, circuit breaker operation count and circuit breaker idle time. Since this data is constantly being acquired by the switching command control unit 400, the switching control operation MPU 210 of the switching control arithmetic operation unit 200 can perform operation to correct the opening operation time $T_{opening}$.

Needless to say, a similar operation is performed in the synchronous closing control as well. In the case of synchronous closing control, however, control is normally based on the zero cross point of the power system voltage, so the pre-arc characteristics of the circuit breaker must be considered.

The synchronous switching control algorithm shown in the present embodiment is an example, and any other synchronous switching control algorithm can be applied to the present invention.

Now a concrete data acquisition and storage operation of the switching control system of circuit breaker according to the present embodiment will be described.

After executing the synchronous switching control of the circuit breaker 1100, the switching control unit of circuit breaker 100 stores the synchronous switching control related data at this time. In concrete terms, the following data, for example, is saved.

Main circuit current waveforms before and after circuit breaker switching operation Power system voltage waveforms before and after circuit breaker switching operation Stroke waveform of circuit breaker Switching operation time of circuit breaker State data of circuit breaker (e.g. operation pressure, temperature, control voltage)

Other

An embodiment of the data acquisition and storage operation is as follows.

(i) The switching control operation MPU 210 of the switching control arithmetic operation unit 200 writes the synchronous switching control related data acquired from the switching command control unit 400 via the parallel transmission medium 140, which is an I/O bus, to the DPRAM 30 of the transmission medium 150.

(ii) The communication operation MPU 310 of the communication arithmetic operation unit 300 acquires the synchronous switching control related data written in the DPRAM 30 of the transmission medium 150.

(iii) The communication operation MPU 310 of the communication arithmetic operation unit 300 stores the acquired synchronous switching control related data into the flash ROM 340.

(iv) If a request to acquire the synchronous switching control related data is generated from the display operation unit 700 to the switching control unit of circuit breaker 100, the communication operation MPU 310 of the communication arithmetic operation unit 300 transfers the synchronous switching control related data stored in the flash ROM 340 to the display operation unit 700 via the communication network 500.

(v) The display operation unit 700 stores the transferred synchronous switching control related data into the data storage processing unit 730, which is an external storage device, such as a hard disk, and the display arithmetic operation unit 720 displays the synchronous switching control related data on a display device, such as a monitor, using the display/operation/data processing software as a human interface (hereafter HMI).

Now a concrete setting operation of the switching control system of circuit breaker according to the present embodiment will be described.

The switching control unit of circuit breaker 100 must set a stabilizing value/setting value to perform synchronous switching control of the circuit breaker 1100. Specifically, the following stabilizing value/setting values are set in the switching control unit of circuit breaker 100.

Target opening phase, target closing phase
Circuit breaker switching operation time
Circuit breaker operation characteristic data
Other An embodiment of the stabilizing value/setting value setting operation is as follows.

(i) The display operation unit 700 transmits the stabilizing value/setting value which is input from the HMI or stabilizing value/setting value stored in file format in the display operation unit 700 to the communication arithmetic operation unit 300 via the communication network 500, using the display/operation/data processing software as an HMI.

(ii) The communication operation MPU 310 of the communication arithmetic operation unit 300 stores the transmitted stabilizing value/setting value in the flash ROM 340.

(iii) The switching control operation MPU 210 of the switching control arithmetic operation unit 200 acquires the stabilizing value/setting value via the DPRAM 30 of the transmission medium 150.

(Advantageous Effect)

As described above, the switching control system of circuit breaker according to the present embodiment has the following effects.

The operator of the display operation unit 700 can easily acquire and store the synchronous switching control related data from a remote site via the communication network 500 by having the display/operation/data processing software, which runs on a general purpose computer, function as the HMI.

The operator of the display operation unit 700 can easily set the stabilizing value/setting value of the switching control unit of circuit breaker 100 from a remote site via the communication network 500 by having the display/operation/data processing software, which runs on a general purpose computer, function as the HMI.

If a plurality of general purpose computers having the display operation units 700 are installed in electric stations, and are interconnected via the communication network 500, although this is not illustrated, any switching control unit 100*a* to 100*n* can be accessed from any general purpose computer having the display operation unit 700.

Therefore the synchronous switching control related data of an arbitrary switching control unit 100*a* to 100*n* can be acquired or stored, and the stabilizing value/setting value can be set from any general purpose computer. It is also possible that the general purpose computers are mutually accessed and the display operation unit(s) 700 of one representative computer or several computers is(are) operated as a data server of the synchronous switching control related data and stabilizing/setting values, so that the synchronous switching control related data and stabilizing/setting values can be shared.

Needless to say, the physical switching operation of communication means is not generated for performing maintenance of the switching control units of circuit breaker 100 installed in a plurality of circuits and for collecting various synchronous switching control related data, and various operations can be performed merely by switching the target switching control unit of circuit breaker on the HMI.

In other words, because of connecting via high-speed communication network 500 (e.g. LAN), a switching control system of circuit breaker, which can be easily operated from a remote site and which can perform maintenance and data collection efficiently, compared with a conventional switching control system of circuit breaker, can be provided.

A method of roughly counting the synchronization delay time by a software counter and finely counting by a hardware counter has been used, but in the case of a prior art, a shift due to transmission delay is generated when the software counter is switched to the hardware counter, and this deteriorates the synchronous switching control accuracy.

The switching control system of circuit breaker according to the present embodiment improves this aspect. In other words, the common timing clock C is used for the timing clock of the switching control operation MPU 210 constituting the software timer and the timing clock of the switching command output control unit 450 constituting the hardware timer, and the synchronization delay count value D of the hardware timer is calculated based on this common timing clock C, so the shift generated when the software counter is switched to the hardware counter can be virtually zero.

Therefore compared with a conventional switching control system of circuit breaker, a switching control system of circuit breaker which can perform high precision synchronous switching control can be provided.

Also in the switching control system of circuit breaker of the present embodiment, the switching control operation MPU 210 for executing operations related to the synchronous switching control, and the display operation unit 700, that is the communication operation MPU 310 for executing operations related to communication with HMI of the operator, are completely separated. Because of this, communication with the HMI of the operator is possible without interrupting the operation related to the synchronous switching control which is the most important processing of this system, and the operator can acquire the necessary synchronous switching control related data any time and anywhere.

(Variant Form of Embodiment 1)

The above mentioned switching control system of circuit breaker according to Embodiment 1 can be constructed as shown in the following variant form.

In a plurality of electric stations, the switching control unit of circuit breaker 100 and the display operation unit 700 are connected to a local network of each electric station. This local network of each electric station is interconnected to a wide area network via a router and gateway. For the wide area network, a circuit switching network, such as a telephone line, is used.

In this variant form as well, functions and effects similar to the switching control system of circuit breaker according to Embodiment 1 can be implemented. In addition, by constructing the switching control system of circuit breaker connected to the wide area network like this, the switching control units of circuit breaker 100 installed in a plurality of different electric stations can be easily remote controlled.

For example, only the switching control unit of circuit breaker 100 is installed in an unattended electric station, and the switching control unit of circuit breaker 100 and display operation unit 700 are installed in an attended electric station. By this system configuration, the operator can acquire the necessary synchronous switching control related data any time from an attended electric station, without physically going to an unattended electric station.

Also by installing the display operation unit 700 in a higher control station or power center which has no switching facility, the necessary synchronous switching control related data is acquired at any time from the control station or power center without physically going there.

Embodiment 2

Embodiment 2 of the present invention will now be described with reference to the switching control system of circuit breaker diagram in FIG. 4.

(Configuration)

Figure 4:
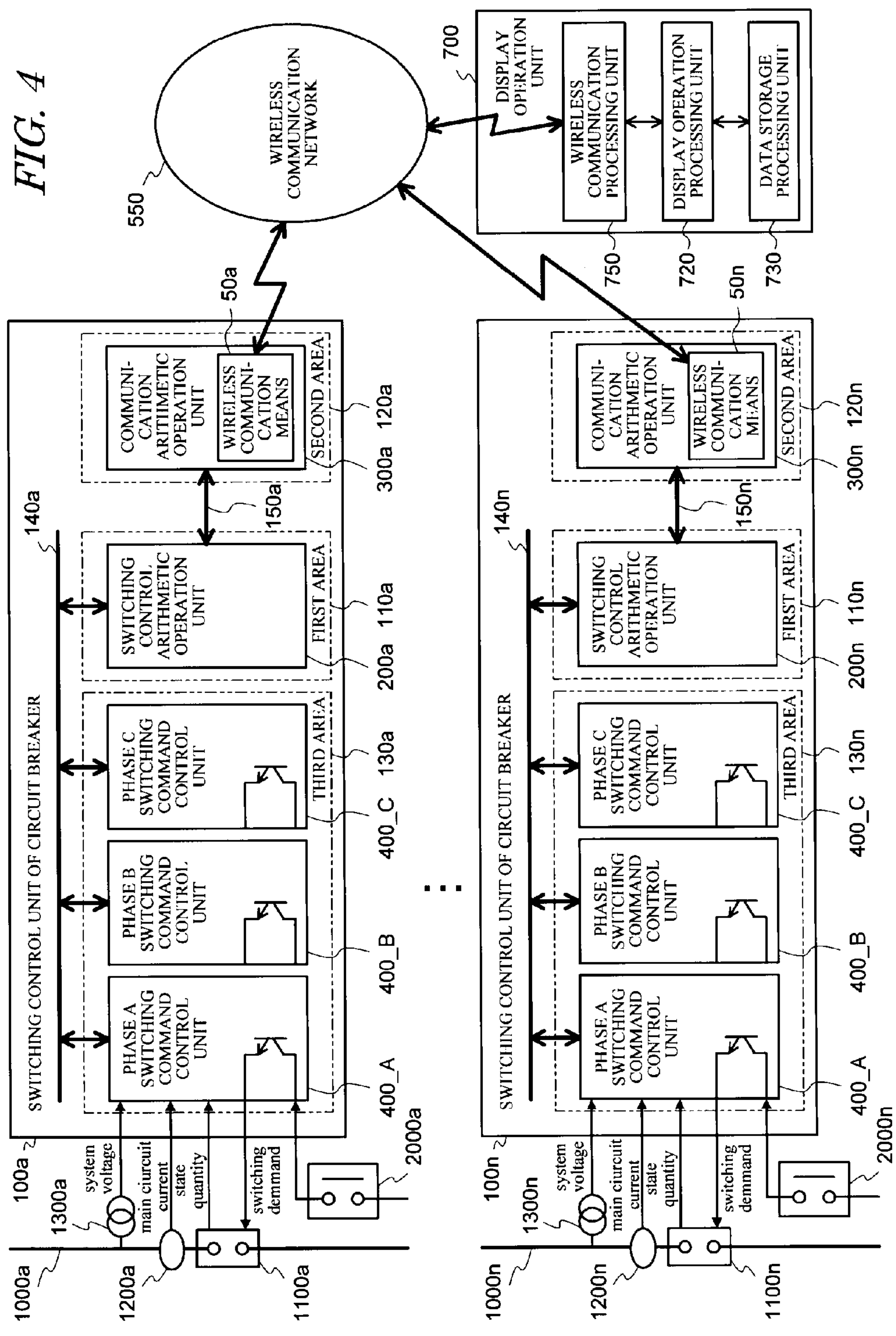
FIG. 4 is a diagram depicting a system configuration of a switching control system of circuit breaker according to Embodiment 2 of the present invention.

In FIG. 4, 100*a* to 100*n* are the switching control units of circuit breaker, 550 is a wireless communication network, and 700 is a display operation unit, which are the major composing elements of the switching control system of circuit breaker of Embodiment 2.

The communication arithmetic operation units 300*a* to 300*n* of the switching control units of circuit breaker 100*a* to 100*n* in FIG. 4 enclose wireless communication means 50*a* to 50*n* respectively. The wireless communication means 50 is the communication interface 40 of the above mentioned Embodiment 1 shown in FIG. 2, of which all or a part is replaced. Needless to say, the wireless communication means 50 and the cable communication interface 40 may be used together. The other detailed configuration of the switching control unit of circuit breaker 100 is the same as Embodiment 1, so the description thereof is omitted.

The display operation unit 700 in FIG. 4 encloses a wireless communication processing unit 750. The wireless communication processing unit 750 is comprised of a wireless LAN interface circuit of a general purpose computer and wireless LAN communication software. This wireless communication processing unit 750 is the communication processing unit 710 in FIG. 1 of Embodiment 1, of which all or a part is replaced.

Needless to say, the wireless communication processing unit 750 and the cable communication processing unit 710 can be used together, in other words, the wireless LAN interface circuit of a general purpose computer and a cable LAN interface can be used together. The other detailed configuration of the display operation unit 700 is the same as Embodiment 1, so description thereof is omitted.

A configuration example of the wireless communication network 550 in FIG. 4 is a wireless communication network connecting the switching control units of circuit breaker 100*a* to 100*n* and the display operation unit 700 via a wireless LAN in a local range, such as an electric station. In the system configuration in FIG. 4, the communication network is constructed only by the wireless communication network 550, but a cable communication network 500 and wireless communication network 550 may coexist via a media converter and hub, and needless to say, a part of the display operation unit 700 and switching control units of circuit breaker 100*a* to 100*n* may be partially interconnected via a cable LAN and partially via a wireless LAN. Also the wireless communication network 550 may be connected with a wide area network via a switching hub and repeater which can be connected with a wireless LAN. One switching control unit 100 and the display operation unit 700 may be connected one-to-one using the wireless communication network 550.

In FIG. 4, the wireless communication means 50 is enclosed in the communication arithmetic operation unit 300, but the wireless communication means 50 may be installed outside the switching control unit of circuit breaker 100 in the system.

In this case, a switching control unit of circuit breaker 100 similar to that in Embodiment 1 is used, and the communication interface 40 of the switching control unit of circuit breaker 100 and the wireless communication means 50 installed outside can be connected via a cable LAN or the like.

Also in FIG. 4, the wireless communication processing unit 750 is enclosed in the display operation unit 700, but the wireless communication processing unit 750 may be installed outside the display operation unit 700. In this case, a general purpose computer similar to that in Embodiment 1 is used to constitute the display operation unit 700, and the wireless LAN device and the general purpose computer are connected via a cable LAN, USB interface or the like.

(Function)

Except that the communication network is wireless, the function similar to Embodiment 1 is implemented, so description thereof is omitted.

(Advantageous Effect)

The switching control system of circuit breaker according to Embodiment 2 has the following effect, in addition to the effects similar to Embodiment 1.

Since the switching control unit of circuit breaker 100 and the display operation unit 700 are connected by wireless, a cable need not be laid. In particular, laying a cable may be difficult in some locations when the switching control system of circuit breaker is attached to a switchgear which has already been installed, but if the present embodiment is applied in such a case, laying a cable is unnecessary, which simplifies construction and is economical.

Also when one switching control unit of circuit breaker 100 and the display operation unit 700 are connected one-to-one, connection is easy since a cable is unnecessary, which improve s convenience for an operator. This is an especially effective means for improving work efficiency when each switching control unit of circuit breaker 100 is connected with the display operation unit 700 one-to-one at the work site, and in checking data collection and operation during periodic instructions.

Embodiment 3

Embodiment 3 of the present invention will now be described with reference to the diagram depicting the switching control system of circuit breaker in FIG. 5.

(Configuration)

Figure 5:
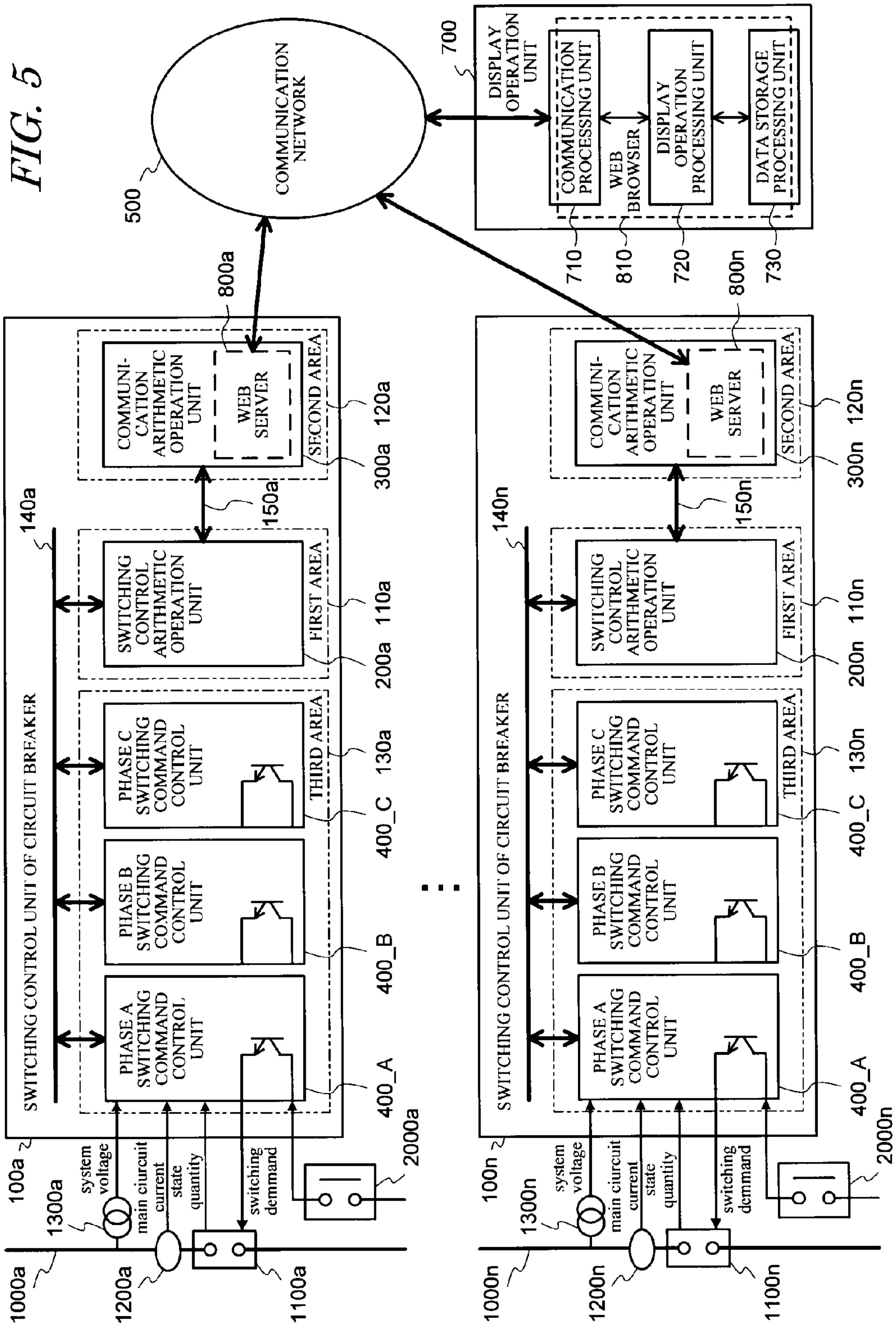
FIG. 5 is a diagram depicting a system configuration of a switching control system of circuit breaker according to Embodiment 3 of the present invention.

In FIG. 5, 100*a* to 100*n* are the switching control units of circuit breaker, 500 is a communication network, and 700 is a display operation unit. The configuration of these composing elements is the same as the switching control system of circuit breaker of Embodiment 1, so detailed description thereof is omitted.

Differences of the switching control system of circuit breaker of Embodiment 3 from the switching control system of circuit breaker of Embodiment 1 are as follows.

(1) Web Server 800 Installed in the Communication Arithmetic Operation Unit of the Switching Control Unit of Circuit Breaker The web server 800 is software having an information transmission function by WWW (World Wide Web) which runs on the communication operation MPU 310 (see FIG. 2)

of the communication arithmetic operation unit 300 of the switching control unit of circuit breaker 100.

(2) Web Browser 810 Installed in the Display Operation Unit

The web browser 810 is a display/operation/data display software which runs on the CPU of the display operation unit 700 constructed by the general purpose computer, and acquires and displays the information sent by the web server 800. A commercial web browser software, such as Internet Explorer, can be used.

(3) Communication Network 500

For the communication network 500 of Embodiment 3, the Internet or intranet (TCP/IP protocol) can be used. To transmit/receive the synchronous switching control related data and stabilizing value/setting value as a file between the switching control unit of circuit breaker 100 and display operation unit 700, FTP or HTTP protocol can be used.

Needless to say, the wireless communication network 550 may be applied as the communication means between the switching control unit of circuit breaker 100 and the display operation unit 700 in the system in the same manner as Embodiment 2.

(Function)

The switching control system of circuit breaker according to Embodiment 3 can implement the following functions in addition to functions similar to Embodiment 1 and Embodiment 2.

The communication operation MPU 310 of the communication arithmetic operation unit 300 of the switching control unit of circuit breaker 100 executes the web server software 800.

The web server 800 stores the synchronous switching control related data, such as the main circuit current waveforms before and after the circuit breaker switching operation, power system voltage waveforms before and after the circuit breaker switching operation, circuit breaker stroke waveforms, circuit breaker switching operation time and circuit breaker state data (e.g. operation pressure, temperature, control voltage), in a format of an HTML document, XML document or the like.

Responding to the request from the web browser 810 which runs on the display operation unit 700, the web browser 800 sends the synchronous switching control related data to the display operation unit 700 via a communication network 500, such as the Internet or intranet.

The display operation unit 700 can display the synchronous switching control related data on the web browser 810 in such a format as a table. The waveform data can also be displayed as a graph using a scripting language which runs on the web browser. In other words, the operator can read the synchronous switching control related data using the web browser 810 as an HMI. The received synchronous switching control related data may be stored in the data storage processing unit 730, which is an external storage device, such as a hard disk, using the web browser 810 as an HMI.

The stabilizing value/setting value of the switching control unit of circuit breaker 100 can also be set using the web browser 810 as an HMI. A stabilizing value/setting value which was input to the web browser 810, or a stabilizing/setting value stored in file format can be sent to the web server 800 of the communication arithmetic operation unit 300 via the communication network 500, such as the Internet or intranet.

The communication arithmetic operation unit 300 stores the stabilizing value/setting value transmitted to the web server 800 into the flash ROM 340 (see FIG. 2).

In order to insure security for network use, a password may be set in the web server 800 to limit access.

The functions of the web server 800 and the web browser 810 shown in the present embodiment are examples, and needless to say, other general functions of a web server and web browser can also be applied.

(Advantageous Effect)

The switching control system of circuit breaker according to Embodiment 3 implements the following effects in addition to the effects similar to Embodiment 1 and Embodiment 2.

According to the present embodiment, commercial web browser software, such as Internet Explorer, can be used as the HMI software of an operator. The operator need not install dedicated communication software and maintenance software in the display operation unit 700 (e.g. computer for HMI), and the manufacture need not provide dedicated communication software and maintenance software to the user by CD-ROM, for example.

Therefore [the present embodiment] can solve the problem of a conventional switching control system of circuit breaker, that is, the switching controlgear of circuit breaker cannot be connected from a PC in which dedicated software is not installed, which is very inconvenient especially from the aspect of storing and managing various data. The operator can easily connect to the switching control system of circuit breaker only if a PC, in which an operating system currently being used by the general public and Internet Explorer are installed, are available, and convenience to the operator dramatically improves.

Embodiment 4

Embodiment 4 of the present invention will now be described with reference to the diagram depicting the switching control system of circuit breaker in FIG. 6.

(Configuration)

Figure 6:
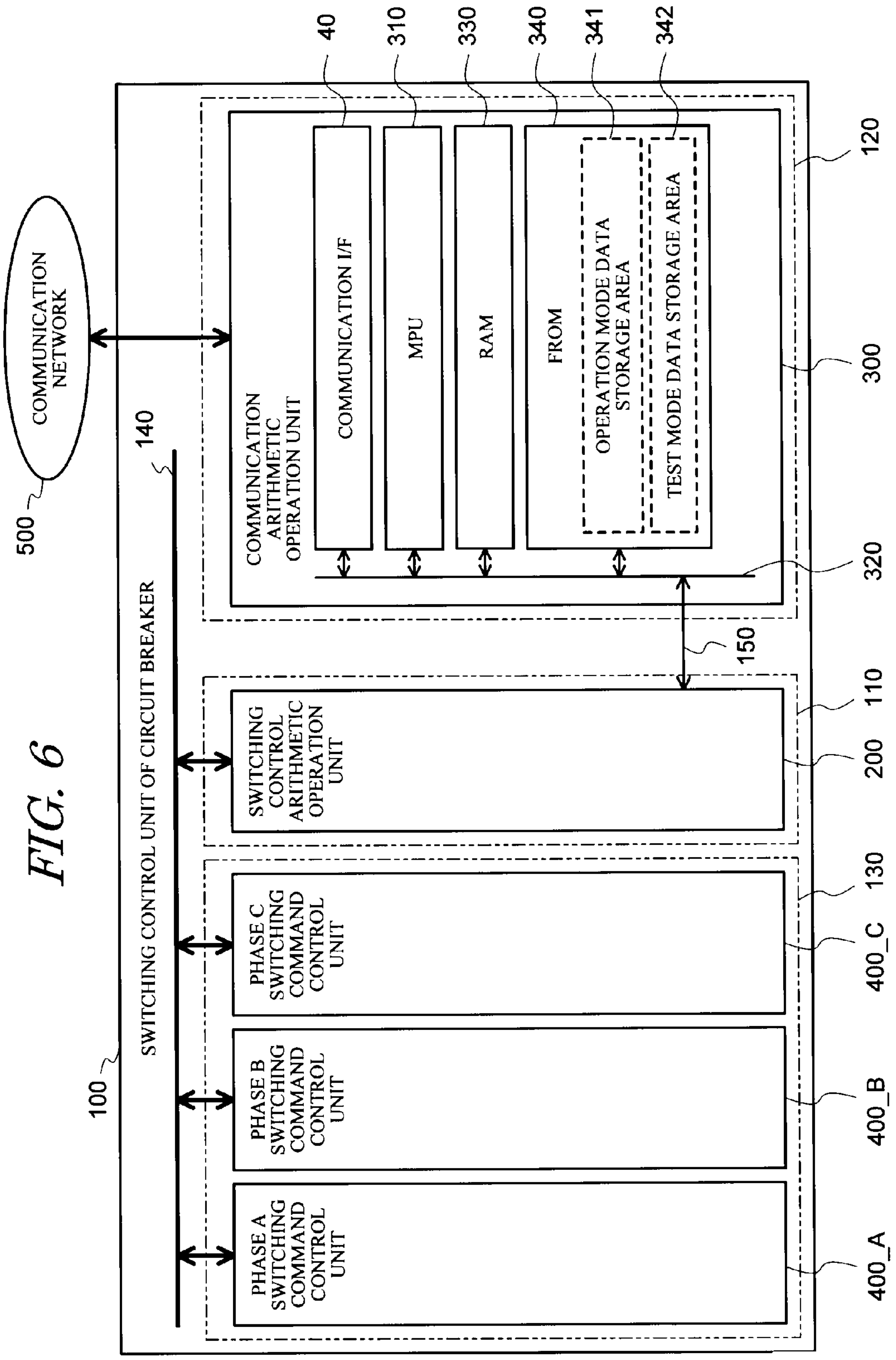
FIG. 6 is a detailed block diagram depicting a switching control unit of circuit breaker according to Embodiment 4 of the present invention.

The system configuration of Embodiment 4 is similar to the above mentioned Embodiment 1, Embodiment 2 and Embodiment 3, so FIG. 6 shows FIG. 2 from which portions unnecessary to described Embodiment 4 are omitted.

As the detailed block diagram of the switching control unit of circuit breaker 100 in FIG. 6 shows, a configuration characteristic of Embodiment 4 is that the data storage area disposed in the FROM 340 of the communication arithmetic operation unit 300 of the second area 120 is separated into a plurality of data storage areas which have different intended uses. In other words, the data storage area of the synchronous switching control related data, which is stored when the synchronous switching control of the circuit breaker 1100 is executed, is separated into an operation mode data storage area 341 and test mode data storage area 342 on the FROM 340.

Needless to say, the data storage area may be constructed on a non-volatile memory other than the FROM 340.

(Function)

The switching control system of circuit breaker according to the present embodiment can implement the following functions in addition to the functions similar to Embodiment 1, Embodiment 2 and Embodiment 3.

The switching control system of circuit breaker of the present embodiment has two operation modes, that is, an operation mode in which [the system] operates under the commercial operation of the electric station, and test mode in which [the system] operates under a state of manufacturer testing.

The communication operation MPU 310 classifies the synchronous switching control related data transferred from the switching control arithmetic operation unit 200 according to the operation mode, and stores the data in the FROM 340.

If the synchronous switching control of the circuit breaker 1100 is executed in a setting of the operation mode, the synchronous switching control related data is stored in the operation mode data storage area 341 in the FROM 340.

If the synchronous switching control of the circuit breaker 1100 is executed in the setting of test mode, the synchronous switching control related data is stored in the test mode data storage area 342 in the FROM 340.

Even if the switching control system of circuit breaker has a mode other than the above mentioned three modes, the synchronous switching control related data of each operation mode can be stored in three or more data storage areas corresponding to each operation mode.

If a data transmission is received from the display operation unit 700 via the communication network 500, the communication operation MPU 310 sends the synchronous switching control related data of the requested operation mode to the display operation unit 700.

(Advantageous Effect)

The switching control system of circuit breaker according to Embodiment 4 implements the following effects in addition to the effects similar to Embodiment 1, Embodiment 2 and Embodiment 3.

When the synchronous switching control of the circuit breaker 1100 is executed, the synchronous switching control related data is stored in the FROM 340, but the storage capacity of the data storage area of the FROM 340 is limited, so old data is overwritten and deleted when new data which exceeds the storage capacity of the data storage area is stored.

According to Embodiment 4, test data during factory testing and field installation testing can be saved in the switching control unit of circuit breaker 100, even after repeatedly executing the synchronous switching control after the electric station starts commercial operation.

It is well known that the initial data of the circuit breaker operation characteristics, such as the circuit breaker operation time and stroke waveforms, become extremely important data during periodic inspection or when an unexpected accident of the circuit breaker occurs, and by using Embodiment 4, the latest data and initial data can be easily and quickly compared at a remote site or local site, and efficiency of maintenance, inspection and repair of a circuit breaker can be improved.

Embodiment 5

Embodiment 5 of the present invention will now be described with reference to the diagram depicting the switching control system of circuit breaker in FIG. 7.

(Configuration)

Figure 7:
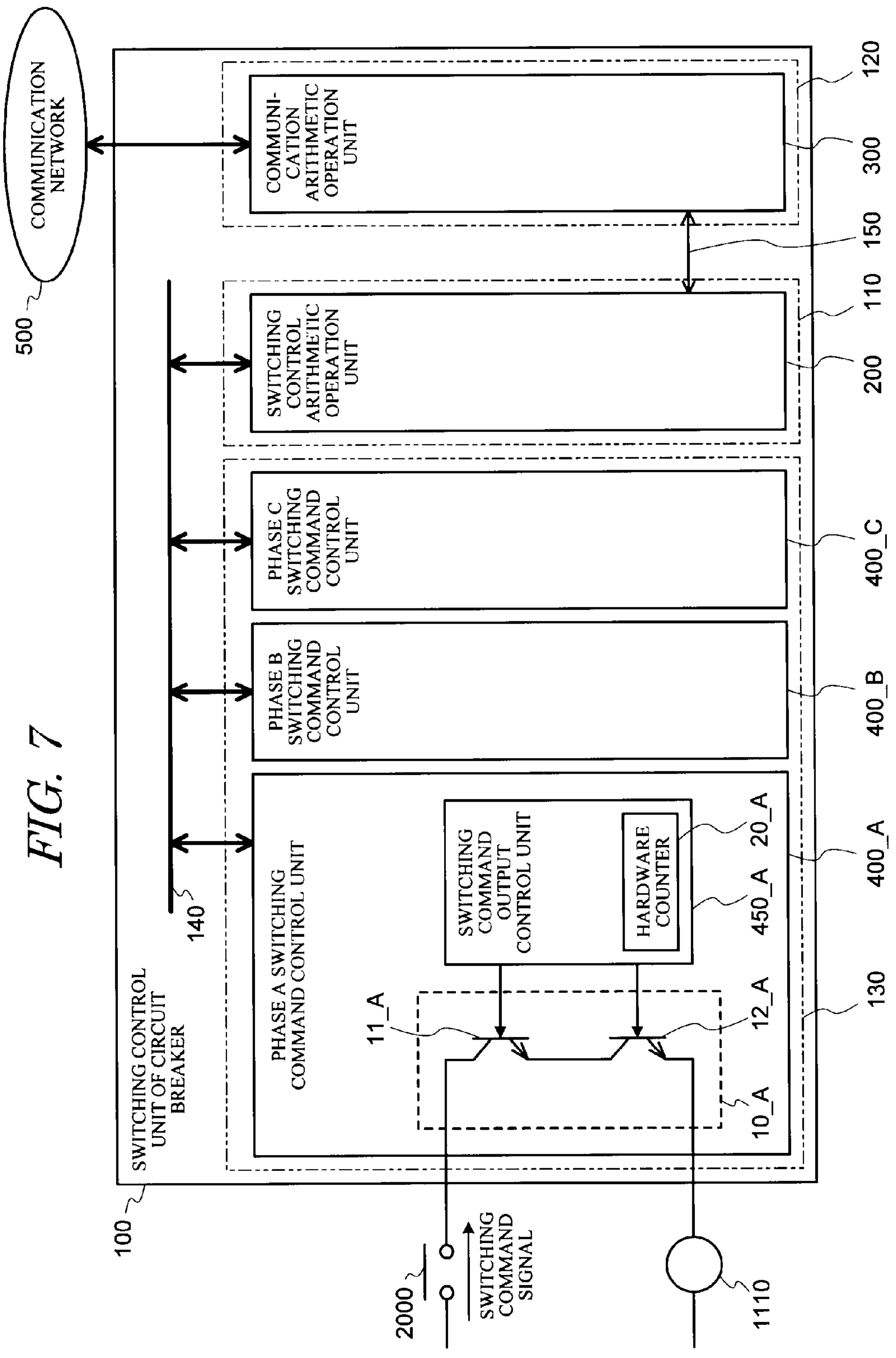
FIG. 7 is a detailed block diagram depicting a switching control unit of circuit breaker according to Embodiment 5 of the present invention.

The system configuration of Embodiment 5 is similar to the above mentioned Embodiment 1, Embodiment 2 and Embodiment 3, so FIG. 7 shows FIG. 2 from which portions unnecessary to described Embodiment 5 are omitted.

As the detailed block diagram of the switching control unit of circuit breaker 100 in FIG. 7 shows, a configuration characteristic of Embodiment 5 is that the semiconductor switch 11 and the semiconductor switch 12 of the switching command output unit 10 of the switching command control unit 400 of the third area 130 are connected in series.

In FIG. 7, the semiconductor switch 11 and the semiconductor switch 12 are controlled by the common switching command output control unit 450, but an independent switching command output control unit 450 may be installed for each semiconductor switch.

(Function)

The switching control system of circuit breaker according to the present embodiment can implement the following functions in addition to functions similar to Embodiment 1, Embodiment 2 and Embodiment 3.

Even if one of the semiconductor switch 11 and semiconductor switch 12 constantly becomes ON state due to an abnormality, the other semiconductor switch can perform delay control of the switching command signal, whereby the synchronous switching control of the circuit breaker 1100 can be performed.

According to the present embodiment, the circuit breaker 1100 cannot be operated if one of the semiconductor switches constantly becomes OFF state due to an abnormality.

(Advantageous Effect)

The switching control system of circuit breaker according to the present embodiment implements the following effects, particularly in the synchronous closing control, in addition to the effects similar to Embodiment 1, Embodiment 2 and Embodiment 3.

In the closing control of the circuit breaker, prevention of the generation of excessive surge voltage supplied due to the failure of synchronous closing control during closing operation is normally more critical than the prevention of a non-operation during closing operation.

The present embodiment solves such a problem, and even if one of the two semiconductor switches connected in series constantly becomes ON status due to an abnormality, the synchronous closing control is enabled, which improves reliability of the switching control system of circuit breaker.

Embodiment 6

Embodiment 6 of the present invention will now be described with reference to the diagram depicting the switching control system of circuit breaker in FIG. 8.

(Configuration)

Figure 8:
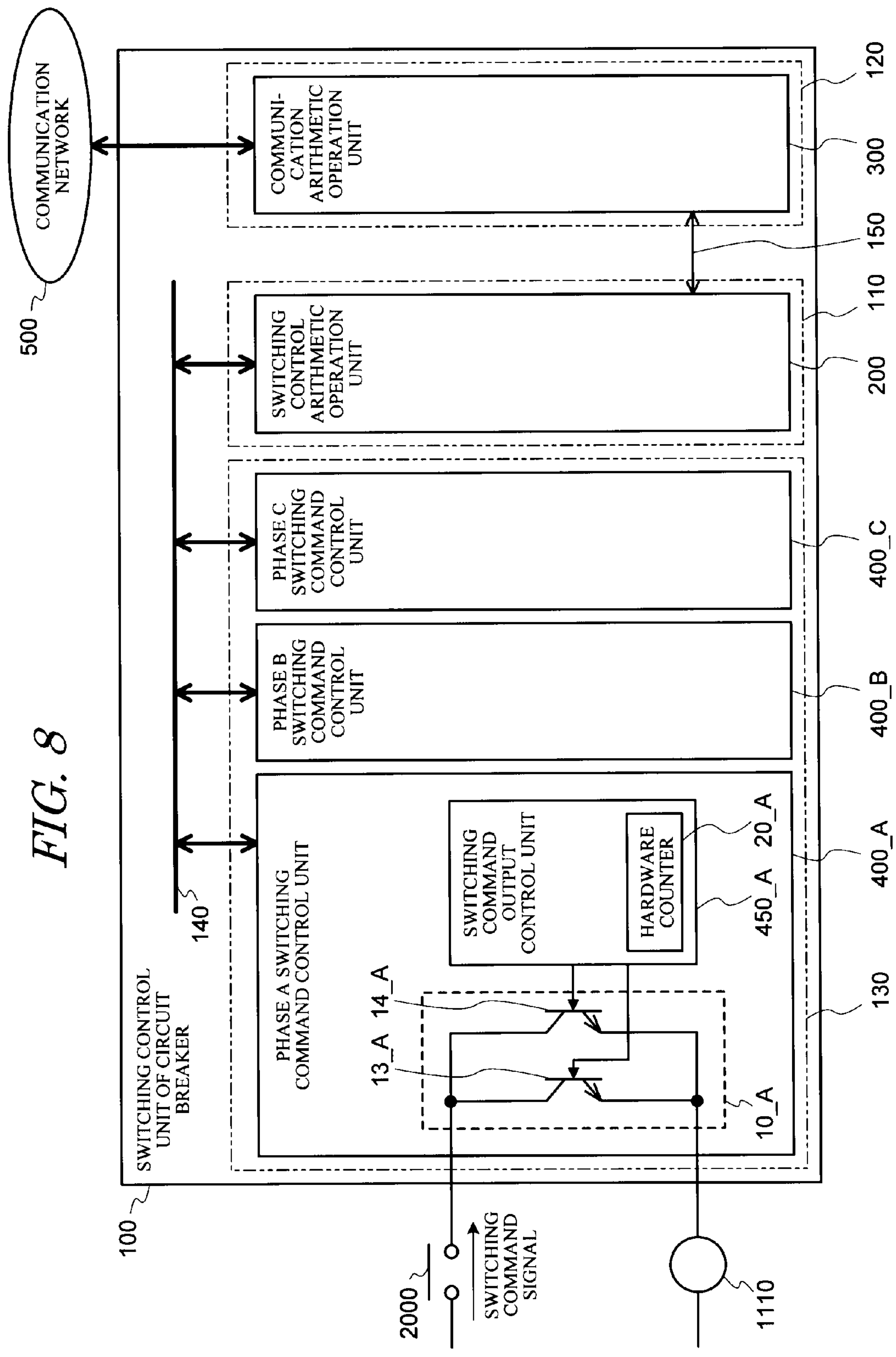
FIG. 8 is a detailed block diagram depicting a switching control unit of circuit breaker according to Embodiment 6 of the present invention.

The system configuration of Embodiment 6 is similar to the above mentioned Embodiment 1, Embodiment 2 and Embodiment 3, so FIG. 8 shows FIG. 2 from which portions unnecessary to describe Embodiment 6 are omitted.

As the detailed block diagram of the switching control unit of circuit breaker 100 according to Embodiment 6 in FIG. 8 shows, a configuration characteristic of Embodiment 6 is that the semiconductor switch 13 and semiconductor switch 14 of the switching command output unit 10 of the switching command control unit 400 of the third area 130 are connected in parallel.

In FIG. 8, the semiconductor switch 13 and the semiconductor switch 14 are controlled by the common switching command output control unit 450, but an independent switching command output control unit 450 may be installed for each semiconductor switch.

(Function)

The switching control system of circuit breaker according to Embodiment 6 can implement the following functions in addition to functions similar to Embodiment 1, Embodiment 2 and Embodiment 3.

Even if one of the semiconductor switch 13 and semiconductor switch 14 constantly becomes OFF state due to an abnormality, the other semiconductor switch can perform delay control of the switching command signal, whereby the synchronous switching control of the circuit breaker 1100 can be performed.

The synchronous switching control of the circuit breaker 1100 cannot be performed if one of the semiconductor switches constantly becomes ON state due to an abnormality, but a non-operation of the circuit breaker 1100 can be prevented (in this case, the circuit breaker performs switching operation in a random phase).

(Advantageous Effect)

The switching control system of circuit breaker according to Embodiment 6 implements the following effects, in particular, in the synchronous opening control, in addition to the effects similar to Embodiment 1, Embodiment 2 and Embodiment 3.

In opening control of the circuit breaker, prevention of a non-operation during the opening operation is most critical. Whereas the generation of a surge voltage due to a failure of synchronous opening control during the opening operation can be tolerated to a certain degree.

Embodiment 6 solves such a problem, and even if one of the two semiconductor switches connected in parallel constantly becomes OFF state due to an abnormality, the synchronous opening control is enabled, and even if one of the two semiconductor switches connected in parallel constantly becomes ON state due to an abnormality, non-operation of the circuit breaker can be prevented, which improves reliability of the switching control system of circuit breaker.

Embodiment 7

Embodiment 7 of the present invention will now be described with reference to the diagram depicting the switching control system of circuit breaker in FIG. 9.

(Configuration)

Figure 9:
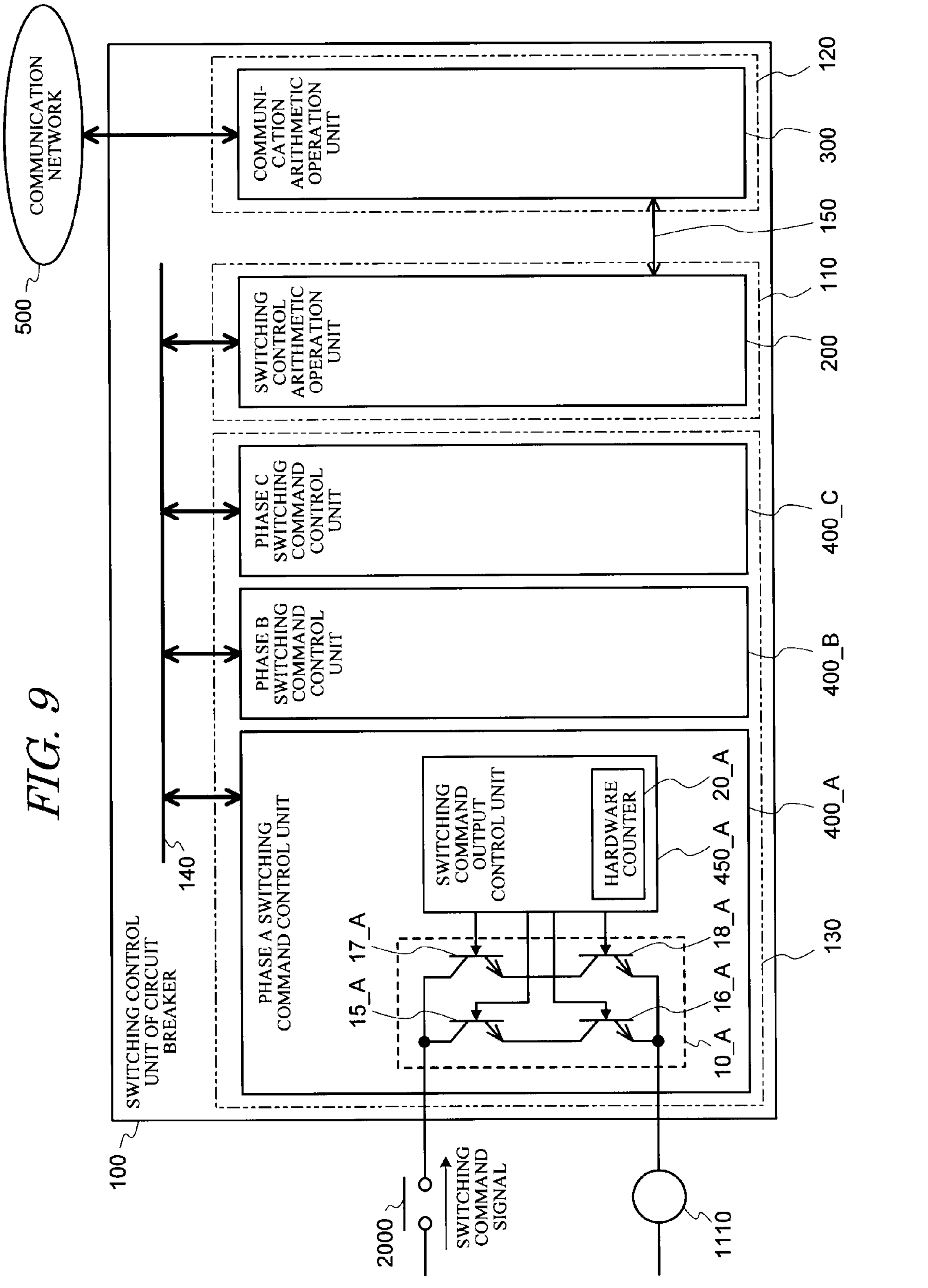
FIG. 9 is a detailed block diagram depicting a switching control unit of circuit breaker according to Embodiment 7 of the present invention.

The system configuration of Embodiment 7 is similar to the above mentioned Embodiment 1, Embodiment 2 and Embodiment 3, so FIG. 9 shows FIG. 2 from which portions unnecessary to described Embodiment 7 are omitted.

As the detailed block diagram of the switching control unit of circuit breaker 100 according to Embodiment 7 in FIG. 9 shows, a configuration characteristic of Embodiment 7 is in the connection configuration of the switching common output unit 10 of the switching command control unit 400 of the third area 130. In other words, the semiconductor switch 15 and semiconductor switch 16 are connected in series (series switch 1), and the semiconductor switch 17 and semiconductor switch 18 are connected in series (series switch 2). The series switch 1 and series switch 2 are then connected in parallel, that is, the semiconductor switches are in a two-series two-parallel configuration.

In FIG. 9, the semiconductor switch 15, semiconductor switch 16, semiconductor switch 17 and semiconductor switch 18 are controlled by the common switching command output control unit 450, but an independent switching command output control unit 450 may be installed for each semiconductor switch, or an independent switching command output control unit 450 may be installed for the series switch 1 and series switch 2 respectively.

(Function)

The switching control system of circuit breaker according to Embodiment 7 can implement the following functions in addition to the functions similar to Embodiment 1, Embodiment 2 and Embodiment 3.

Even if one of the semiconductor switch 15, semiconductor switch 16, semiconductor switch 17 and semiconductor switch 18 constantly becomes ON state due to an abnormality, the synchronous switching control of the circuit breaker 1100 can be performed by performing delay control of the switching command signal using a semiconductor switch connected in series with this semiconductor switch. In this case, it is clear that the other series switch connected in parallel operates normally and performs synchronous switching control, and can perform the synchronous switching control of the circuit breaker 1100 normally as the switching control unit of circuit breaker 100.

If one of the semiconductor switch 15, semiconductor switch 16, semiconductor switch 17 and semiconductor switch 18 constantly becomes OFF state due to an abnormality, the series switch to which this semiconductor switch belongs becomes non-operation, but the other series switch operates normally and can perform synchronous switching control. Therefore in this case as well, [the other series switch] can perform the synchronous switching control of the circuit breaker 1100 normally as the switching control unit of circuit breaker 100.

(Advantageous Effect)

The switching control system of circuit breaker according to Embodiment 7 implements the following effects in addition to the effects similar to Embodiment 1, Embodiment 2 and Embodiment 3.

In the synchronous closing control, the configuration of Embodiment 5 can insure sufficient reliability with economy. In the synchronous opening control, the configuration of Embodiment 6 can insure sufficient reliability with economy.

However, higher reliability may be demanded in a part of the key system, and neither failure in the synchronous switching control nor non-operation of the circuit breaker may be allowed at all.

The present embodiment is to solve the problem, and even if one of the four semiconductor switches, in which two are connected in series and two are connected in parallel, constantly becomes ON state or OFF state due to an abnormality, the synchronous switching control is enabled, and non-operation of the circuit breaker can be prevented, whereby the reliability of the switching control system of circuit breaker can be improved.

Embodiment 8

Embodiment 8 of the present invention will now be described with reference to the diagram depicting the switching control system of circuit breaker in FIG. 10.

(Configuration)

Figure 10:
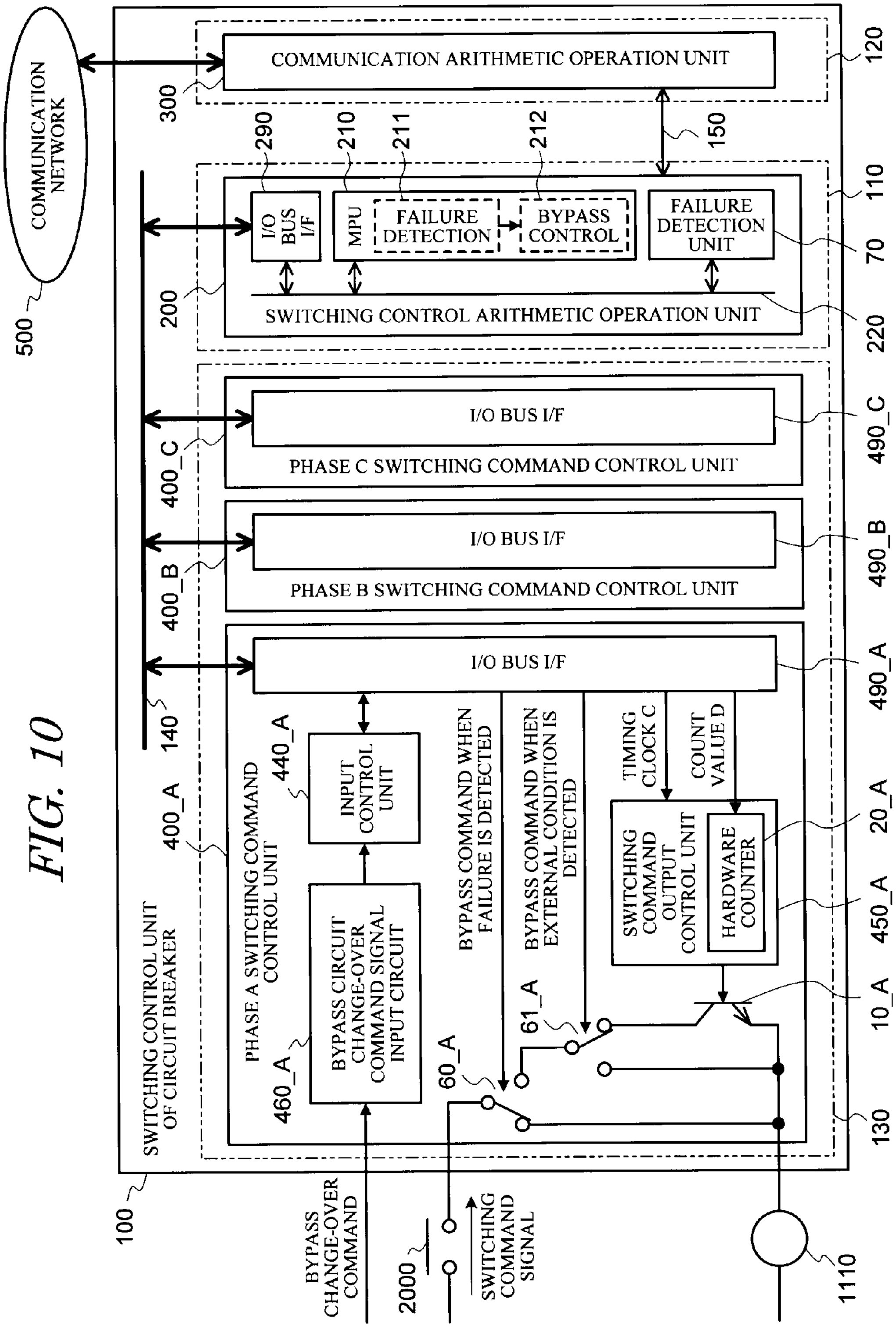
FIG. 10 is a detailed block diagram depicting a switching control unit of circuit breaker according to Embodiment 8 of the present invention.

The system configuration of Embodiment 8 is similar to the above mentioned Embodiment 1, Embodiment 2 and Embodiment 3, so FIG. 10 shows FIG. 2 from which portions unnecessary to described Embodiment 8 are omitted.

As the detailed block diagram of the switching control unit of circuit breaker 100 according to Embodiment 8 in FIG. 10 shows, a configuration characteristic of Embodiment 8 is in the bypass circuit and bypass circuit 61, which are connected in parallel in the switching command output unit 10 of the switching command control unit 400 of the third area 130.

Describing in more details, the bypass circuit 61 which is operated by "a bypass command when an external condition is detected" is connected in parallel with the switching command output unit 10, and the bypass circuit 60 which is operated by "a bypass command when a failure is detected" is connected in parallel outside this bypass circuit.

In both bypass circuits, a selector switch of the bypass circuit is constructed so that the switching command signal flows into only one of the bypass side circuit and switching command output unit 10. In other words, the bypass side circuit and switching command output unit 10 are not turned ON simultaneously.

For the selector switch of the bypass circuit, a mechanical relay may be used, or an electronic switch, such as a semiconductor switch, may be used. The functions of the bypass circuit 60 and the bypass circuit 61 may be integrated into one common bypass circuit (one common bypass circuit may be constructed so as to be operated by one of the signals of the "bypass command when an external condition is detected", and the "bypass command when a failure is detected").

A bypass switching signal from the outside, such as a higher-ranking device 2000, is input to the bypass circuit change-over command signal input circuit 460. The bypass switching signal is sent to the switching control operation MPU 210 of the switching control arithmetic operation unit 200 via the input control unit 440 and the I/O bus interface 490.

The DI (Digital) input circuit 430 may also function as the bypass circuit change-over command signal input circuit 460.

The output of the bypass circuit change-over command signal input circuit 460 may be directly connected to the bypass circuit 61.

In the switching control arithmetic operation unit 200 of the first area 110, a failure detection unit 70 is disposed, and the failure detection information is input to the switching control operation MPU 210 via the local bus 220. In FIG. 10, the failure detection unit 70 is disposed only in the switching control arithmetic operation unit 200, but if necessary, the failure detection unit may be disposed in each circuit of the switching control unit of circuit breaker 100, such as the switching command control unit 400 and the communication arithmetic operation unit 300, so that the failure detection information is sent to the switching control operation MPU 210 of the switching control arithmetic operation unit 200 via the parallel transmission medium 140 and DPRAM 30.

A failure detection processing 211 which is a software for processing the failure detection information, and a bypass control processing 212 which is a software for controlling the bypass circuits based on the failure detection result, are installed in the switching control operation MPU 210 of the switching control arithmetic operation unit 200.

The items of which abnormalities cannot be detected by the switching control operation MPU 210, because the function of the switching control operation MPU 210 cannot be maintained due to a power supply drop abnormality, power supply loss abnormality and MPU runaway abnormality, are not illustrated, but output from the respective power supply abnormality detection means and a watchdog timer (MPU runaway abnormality detection means) may be directly sent to the bypass circuit 60.

For abnormalities other than a power supply drop abnormality, power supply loss abnormality and MPU runaway abnormality, output from the target failure detection unit may be directly sent to the bypass circuit 60 if [the abnormality] can be judged by a logical circuit, for example, without requiring the abnormality decision of the switching control operation MPU 210.

(Function)

The switching control system of circuit breaker according to Embodiment 8 can implement the following functions in addition to the functions similar to Embodiment 1, Embodiment 2 and Embodiment 3.

When an abnormality of the switching control unit of circuit breaker 100 is detected in the failure detection unit 70 of the switching control arithmetic operation unit 200, for example, the switching control operation MPU 210 outputs a "bypass command when a failure is detected". The "bypass command when a failure is detected" is sent to the switching command control unit 400 via the parallel transmission medium 140, and the bypass circuit 60 is changed over to the bypass side. If the switching command signal is input in this state, from the higher-ranking device 2000, such as a protective relay device or BCU, the switching command signal is output to the circuit breaker driving coil 1110 without passing through the switching command output unit 10. In other words, the circuit breaker performs normal switching operation without performing synchronous switching control.

If a bypass switching signal is input from the outside, such as a higher-ranking device 2000, to the switching control unit of circuit breaker 100, the switching control operation MPU 210 outputs a "bypass command when an external condition is detected". The "bypass command when an external condition is detected" is sent to the switching command control unit 400 via the parallel transmission medium 140, and the bypass circuit 61 is changed over to the bypass side. If the switching command signal is input from the higher-ranking device 2000 in this state, the switching command signal is output to the circuit breaker drive coil 1110 without passing through the switching command output unit 10. In other words, the circuit breaker performs normal switching operation without performing synchronous switching control.

(Advantageous Effect)

The switching control system of circuit breaker according to Embodiment 8 can implement the following effects in addition to effects similar to Embodiment 1, Embodiment 2 and Embodiment 3.

When an abnormality occurs to the switching control unit of circuit breaker 100, the switching command output unit 10 does not always operate normally, and the generation of non-operation of a circuit breaker and failure of synchronous switching control is a concern.

In such a case, the switching control system of circuit breaker of the present embodiment can operate the circuit breaker in a normal switching operation without performing synchronous switching control by automatically switching to the bypass circuit. This effect is particularly useful in the opening operation where non-operation of the circuit breaker becomes a critical problem, and reliability of the switching control system of circuit breaker is improved.

In the embodiment in FIG. 10, the bypass side circuit is connected to the circuit breaker switching command circuit, but the bypass side circuit may be left open. In this configuration, the switching command is locked if an abnormality occurs to the switching control unit of circuit breaker 100. This effect is particularly useful in the closing operation where the generation of an excessive surge voltage, due to failure of the synchronous closing control, becomes a critical problem, and reliability of the switching control system of circuit breaker is improved.

In the inspection of the circuit breaker, normal switching operation without involving the synchronous switching control may be required. According to the present embodiment, normal switching operation without synchronous switching control can be easily performed by inputting the bypass switching signal from the outside, whereby efficiency of maintenance and inspection of the circuit breaker can be improved. Also it is unnecessary to construct the bypass circuit for inspection outside the switching control unit of circuit breaker 100, so the configuration of the external circuit, such as local control panel, can be simplified.

Embodiment 9

Embodiment 9 of the present invention will now be described with reference to the diagram depicting the switching control system of circuit breaker in FIG. 11.

(Configuration)

The system configuration of Embodiment 9 is similar to the above mentioned Embodiment 1, Embodiment 2 and Embodiment 3. So FIG. 11 shows FIG. 2 from which portions unnecessary to describe Embodiment 9 are omitted.

Figure 11:
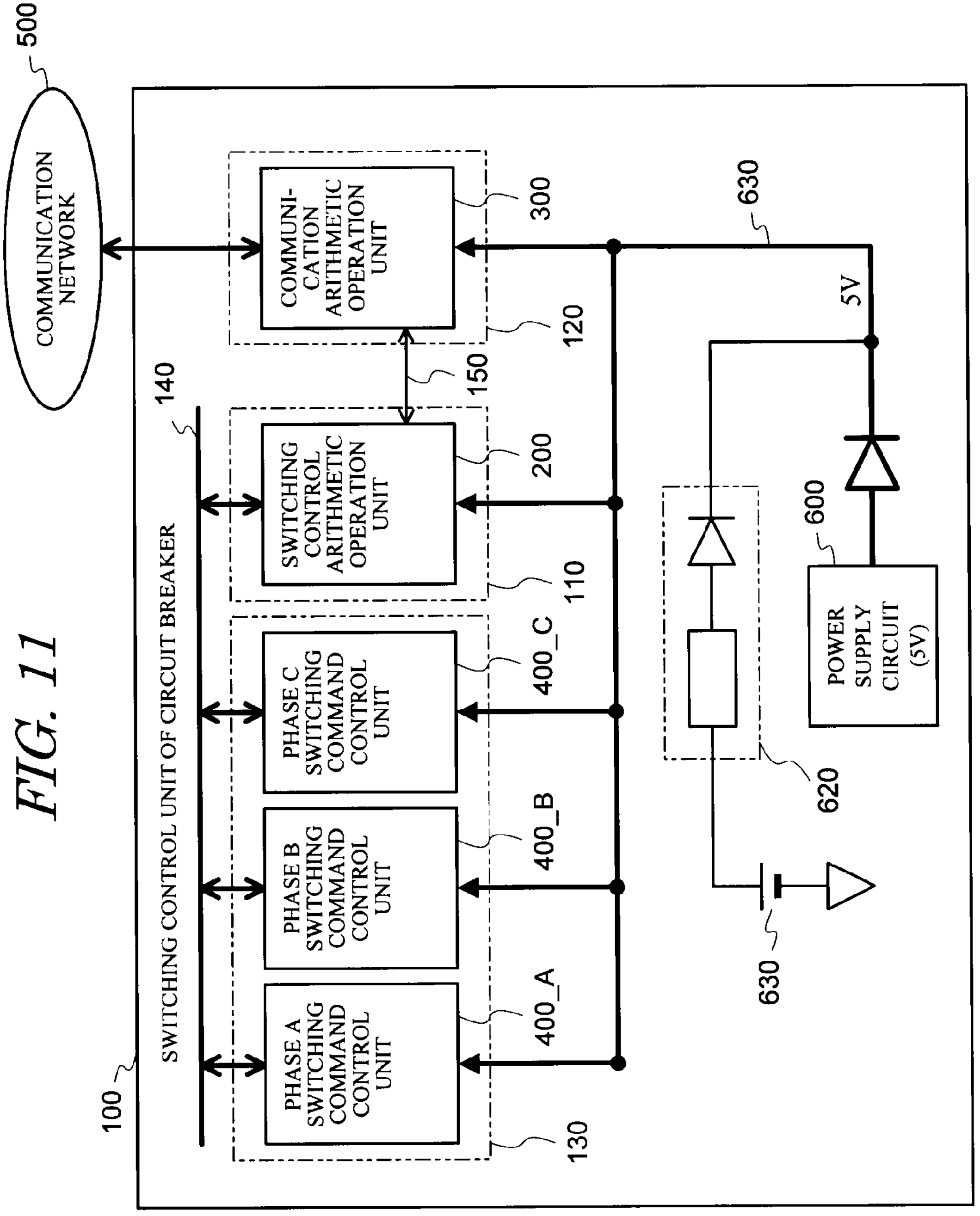
FIG. 11 is a detailed block diagram depicting a switching control unit of circuit breaker according to Embodiment 9 of the present invention.

As the detailed block diagram of the switching control unit of circuit breaker 100 according to Embodiment 9 in FIG. 11 shows, a configuration characteristic of Embodiment 9 is that a backup battery 610 is attached.

Describing in more detail, the switching control unit of circuit breaker 100 has a power supply circuit 600 which converts external power supply voltage (e.g. DC 110V, DC 220V) into DC 5V of internal circuit voltage, and DC 5V is supplied to each circuit, such as the switching control arithmetic operation unit 200, communication arithmetic operation unit 300, and switching command control unit 400. Needless to say, the input voltage DC 100V and DC 220V of the power supply circuit 600 and output voltage DC 5V are examples.

The backup battery 610 is connected to the DC 5V supply circuit 630 via the reverse flow prevention circuit 620. The reverse flow prevention circuit 620 is comprised of a damping resistor and reverse flow prevention diode. For the backup battery 610, a lithium battery, for example, is used.

(Function)

As described in Embodiment 1, the switching control system of circuit breaker according to the present invention corrects the circuit breaker switching operation time using the circuit breaker idle time.

In order to correct the circuit breaker idle time, it is necessary to calculate the difference between the previous circuit breaker operation time (year/month/day, hour/minute/second) and the current time (year/month/day, hour/minute/second), and for this, the clock function must be operating constantly in the switching control system of circuit breaker. This clock function is normally implemented by a real-time clock circuit, but the real-time clock is reset if the power supply from the outside is lost.

Therefore the backup battery 610 is enclosed in the switching control unit of circuit breaker 100 of Embodiment 9, so that the clock function can be maintained even if the switching control unit of circuit breaker 100 loses the power supply from the outside.

Also the backup battery 610 is connected via the reverse flow prevention circuit 620, whereby the backup battery 610 can be replaced without interrupting the power supply of the switching control unit of circuit breaker 100.

In FIG. 11, the backup battery 610 is connected to the 5V supply circuit 630, but may be directly connected to a circuit which requires backup power, such as a real-time clock circuit.

Needless to say, the switching control system of circuit breaker of Embodiment 9 can implemented functions similar to Embodiment 1, Embodiment 2 and Embodiment 3.

(Advantageous Effect)

The switching control system of circuit breaker according to Embodiment 9 implements the following effects in addition to effects similar to Embodiment 1, Embodiment 2 and Embodiment 3.

Even if the switching control unit of circuit breaker 100 loses power supply from the outside, functions required for the synchronous switching control, such as the clock function, can be maintained by the power supply from the backup battery 610.

For example, even if power supply is stopped during transporting, from initial installation to commercial operation, after the time is set at the factory, the clock function can be maintained, and it is unnecessary to set the time again when commercial operation starts. Needless to say, the same effect can be implemented when power supply is temporarily stopped during periodic inspection, after commercial operation started.

The backup battery must be replaced after a predetermined period has elapsed, but can be replaced while the switching control unit of circuit breaker 100 is in operational state, which does not effect the operation of the circuit breaker.

Embodiment 10

The switching control system of circuit breaker according to Embodiment 10 will now be described with reference to the diagram depicting the switching control system of circuit breaker in FIG. 12 and the reignition detection timing in the synchronous opening control in FIG. 13.

(Configuration)

Figure 12:
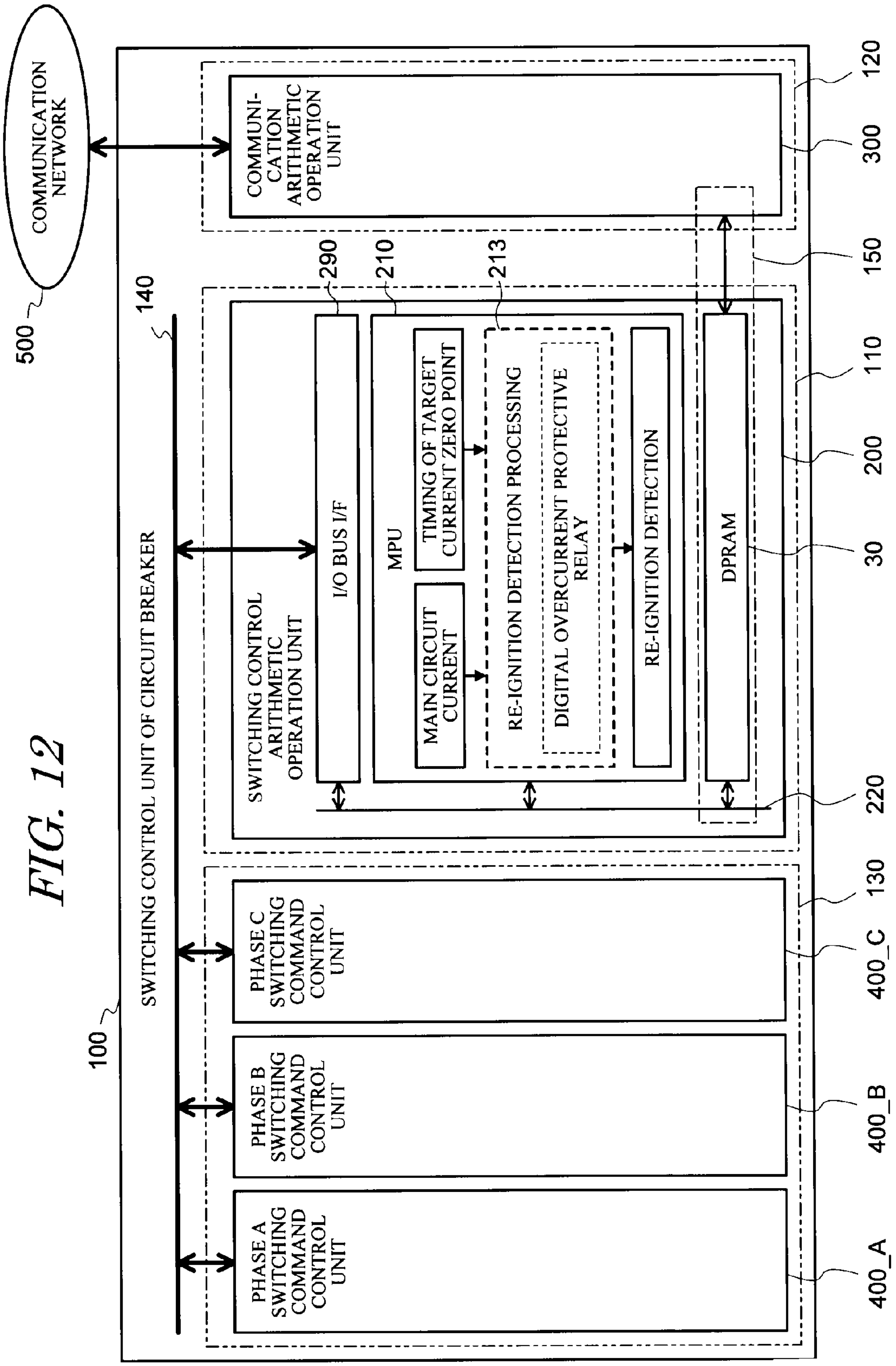
FIG. 12 is a detailed block diagram depicting a switching control unit of circuit breaker according to Embodiment 10 of the present invention.

The system configuration of Embodiment 10 is similar to the above mentioned Embodiment 1, Embodiment 2 and Embodiment 3, so FIG. 12 shows FIG. 2 from which portions unnecessary to describe Embodiment 10 are omitted.

As the detailed block diagram of the switching control unit of circuit breaker 100 in FIG. 12 shows, a configuration characteristic of Embodiment 10 is that a reignition detection processing (reignition detection function) 213, which is a software for reignition detection, is installed in the switching control operation MPU 210 of the switching control arithmetic operation unit 200 of the switching control unit of circuit breaker 100. A timing of the target current zero point acquired from the main circuit current and synchronous opening control operation result is input to the reignition detection processing 213 as an input/output quantity for operation, and the reignition detection result is output.

(Function)

The function of Embodiment 10 will be described with reference to the timing chart of the reignition detection in the synchronous opening control in FIG. 13.

The synchronization opening control by the switching control system of circuit breaker according to Embodiment 10 is the same as Embodiment 1, so description thereof is omitted.

Figure 13:
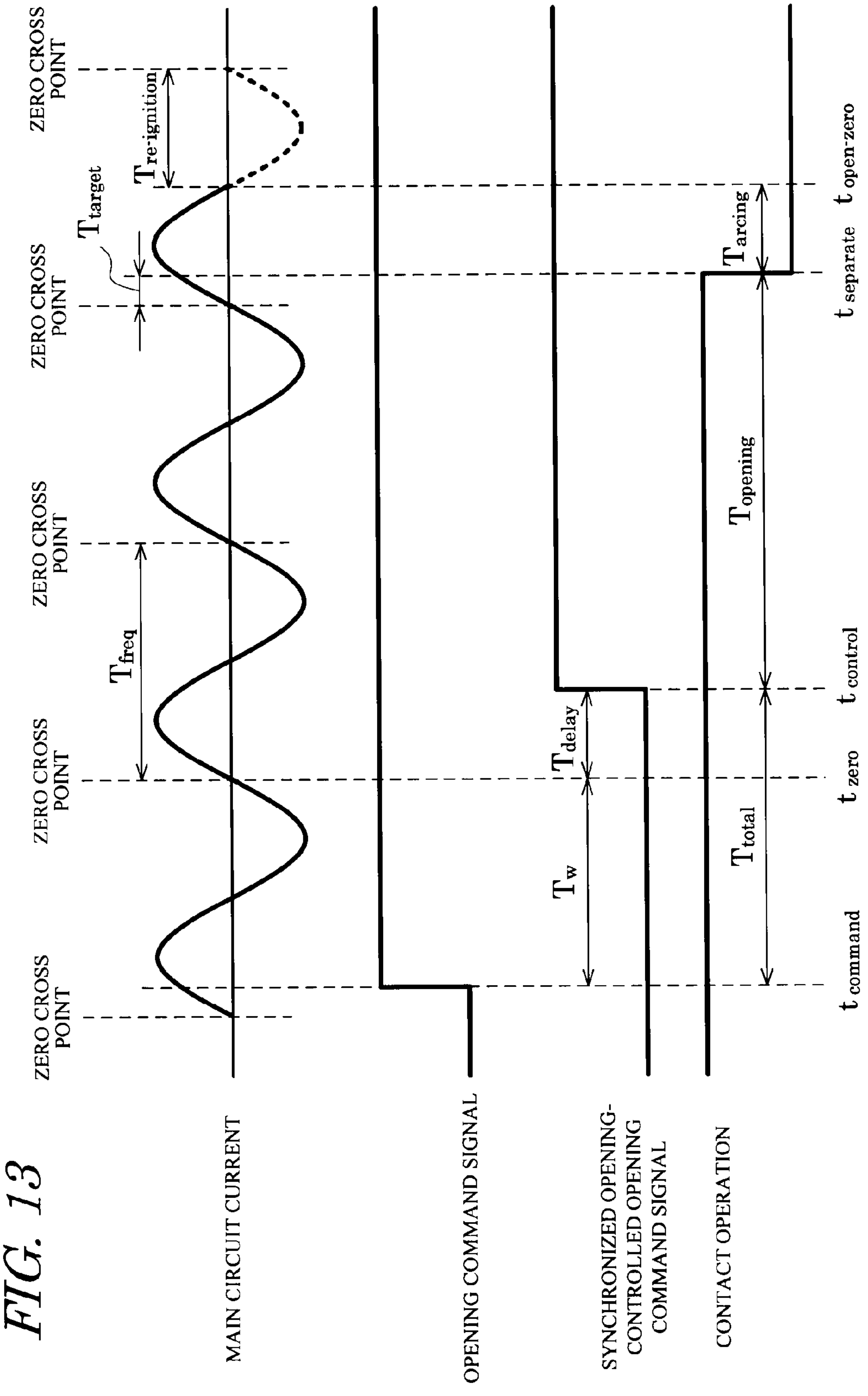
FIG. 13 is a timing chart depicting reignition detection of synchronous opening control according to Embodiment 10 of the present invention.

In FIG. 13, the timing of $t_{open-zero}$ is the timing of the target current zero point. When interruption is completed by the synchronous opening control at the timing of the target current zero point, the contact of the circuit breaker mechanically separates at the timing of the target opening phase $t_{separate}$, and the main circuit current becomes zero and interruption completes at the timing of $t_{open-zero}$ after the arc time $T_{arcing}$ is elapsed.

If reignition is generated and interruption fails, however, the main circuit current does not become zero at the timing $t_{open-zero}$ of the target current zero point, and the main circuit current continuously flows for another half cycle, that is, during the reignition time $T_{re-ignition}$ shown in FIG. 13.

Therefore it can be judged that the circuit breaker reignited if the main circuit current continuously flows for another half cycle period from the target current zero point.

An operation example of a concrete software of the reignition detection processing 213 to be installed in the switching control operation MPU 210 is that a function of the digital overcurrent protective relay is integrated into the reignition detection processing 213, and the occurrence of reignition is judged based on the duration of the main circuit current waveform calculated by the function of the digital overcurrent protective relay, and the timing of the target current zero point acquired from the synchronous opening control operation result. In other words, the overcurrent protective relay is operating before interruption completes, but once interruption completes at the target current zero point, the overcurrent protective relay is reset. Therefore if the overcurrent protective relay is operating in the half cycle period after the target current zero point, it can be judged that reignition occurred.

If reignition is detected in the reignition detection processing 213, the reignition detection result can be notified to the higher-ranking device by outputting an alarm contact, for example. The reignition generation history can be saved in the FROM 340 of the communication processing operation unit 300 via the DPRAM 30. The operator can refer to the reignition generation history using the display operation unit 700 as an HMI.

(Advantageous Effect)

Although reignition detection during opening operation of the circuit breaker is critical to monitor, conventional switching control system of circuit breakers do not have a reignition detection function, and normally reignition is detected by another device or unit.

The switching control system of circuit breaker of Embodiment 10, on the other hand, has the reignition detection function which is implemented by a relatively simply algorithm, and another device or unit need not be combined. Hence a compact and inexpensive switching control system of circuit breaker that can be easily used can be provided.

Embodiment 11

The switching control system of circuit breaker according to Embodiment 11 will now be described with reference to the diagram depicting the switching control system of circuit breaker in FIG. 14 and the timing chart of circuit breaker opening operation and signal from the stroke sensor in FIG. 15.

(Configuration)

Figure 14:
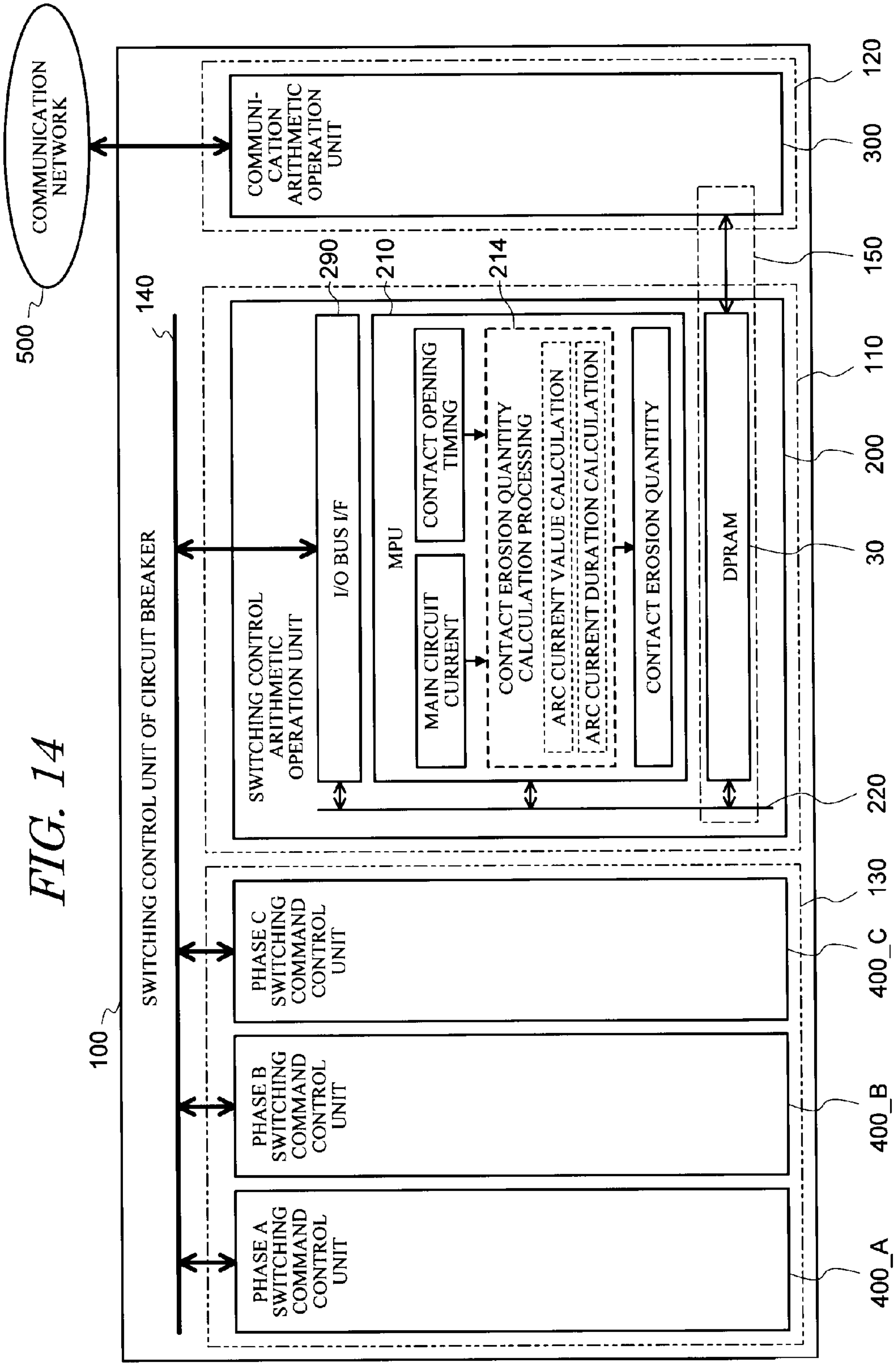
FIG. 14 is a detailed block diagram depicting a switching control unit of circuit breaker according to Embodiment 11 of the present invention.

The system configuration of Embodiment 11 is similar to the above mentioned Embodiment 1, Embodiment 2 and Embodiment 3, so FIG. 14 shows FIG. 2 from which portions unnecessary to described Embodiment 11 are omitted.

As the detailed block diagram of the switching control unit of circuit breaker 100 in FIG. 14 shows, a configuration characteristic of Embodiment 11 is that a contact erosion quantity calculation processing (contact erosion quantity calculation means) 214, which is a software for a contact erosion quantity calculation, is installed in the switching control operation MPU 210 of the switching control arithmetic operation unit 200 of the switching control unit of circuit breaker 100. Main circuit current and mechanical contact opening timing are input to the contact erosion quantity calculation processing 214 as the input/output quantity for operation, and contact erosion quantity calculation result is output.

(Function)

The contact erosion quantity calculation according to Embodiment 11 will be described with reference to the timing chart of the circuit breaker opening operation and signal from the stroke sensor in FIG. 15.

Figure 15:
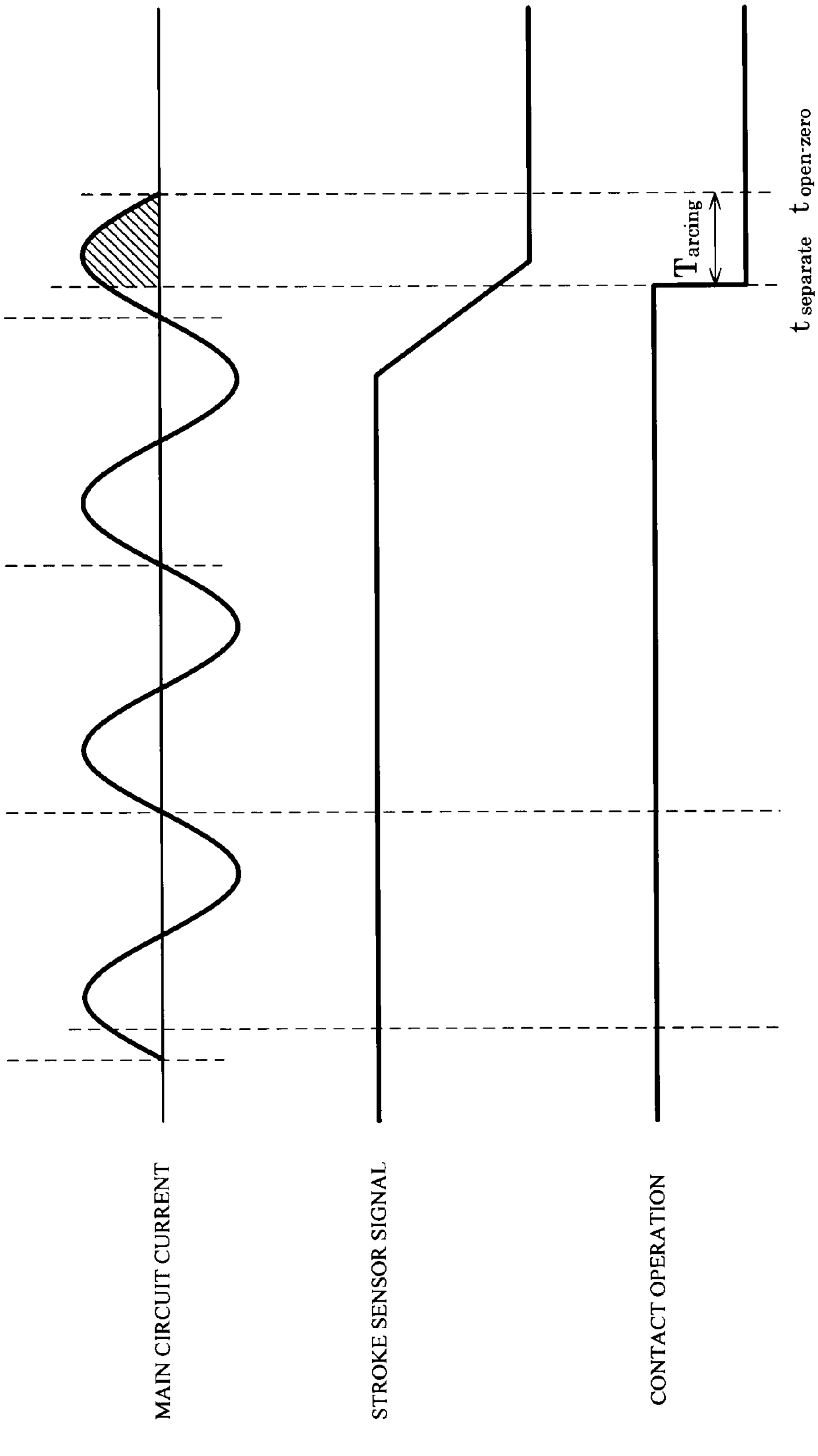
FIG. 15 is a timing chart depicting contact erosion quantity calculation of synchronous opening control according to Embodiment 11 of the present invention.

In FIG. 15, the timing of $t_{separate}$ is a mechanical opening timing of the circuit breaker contact detected by the stroke sensor signal, and the circuit breaker main circuit current shows that the current became zero at the timing of $t_{open\text{-}zero}$ after the circuit breaker contact is opened. This means that an arc was generated between the mechanically opened contacts from $t_{separate}$ to $t_{open\text{-}zero}$, indicated by the shaded portion in FIG. 15. The circuit breaker contact erodes away due to the arc generated between the contacts when the current is interrupted, and it is known that the consumption quantity of a circuit breaker contact is normally in proportion with the nth power of the arc current.

Therefore the contact erosion quantity during the circuit breaker opening operation can be calculated using the arc current value and duration thereof. By accumulating the contact erosion quantity calculated each time, the cumulative consumption quantity can also be recorded.

The contact erosion quantity calculation processing 214 calculates the arc current value and arc current duration from the main circuit current and mechanical contact opening timing, and the contact erosion quantity during the circuit breaker opening operation is calculated based on this result. The contact erosion quantity calculated by the contact erosion quantity calculation processing 214 is output to the DPRAM 30.

The communication processing operation unit 300 stores the contact erosion quantity calculated by the contact erosion quantity calculation processing 214 into the FROM 340. The operator can refer to the contact erosion quantity using the display operation unit 700 as an HMI.

(Advantageous Effect)

The circuit breaker contact erosion quantity is not calculated by conventional switching control system of circuit breakers, but is detected by another device or unit.

The switching control system of circuit breaker of the present invention, on the other hand, has a contact erosion quantity calculation function, and another device or unit need not be combined. Hence a compact and inexpensive switching control system of circuit breaker that can be easily used can be provided.

Embodiment 12

The switching control system of circuit breaker according to Embodiment 12 will now be described with reference to the diagram depicting the switching control system of circuit breaker in FIG. 16 and the potential deterioration failure model graph shown in FIG. 17.

(Configuration)

Figure 16:
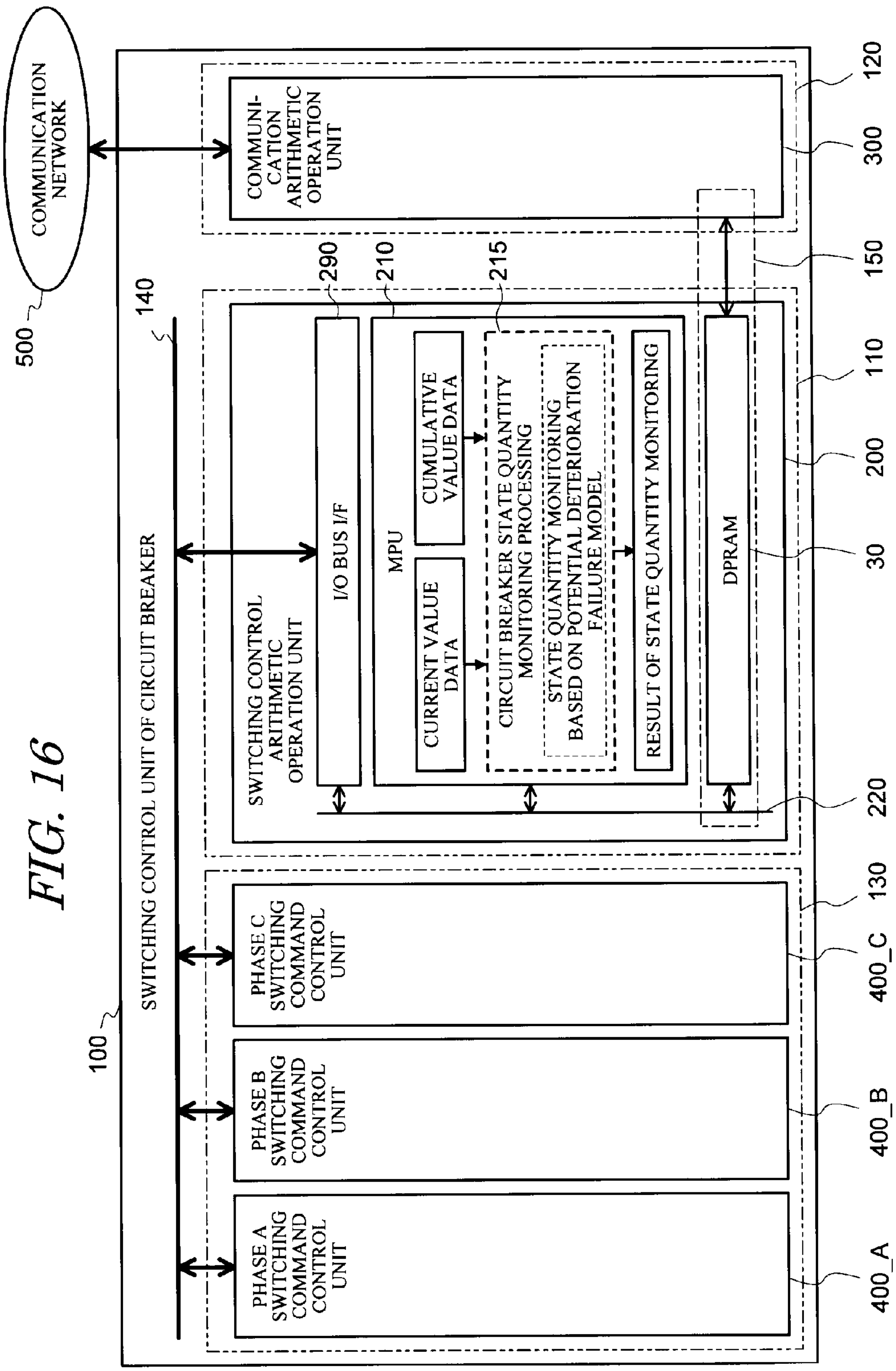
FIG. 16 is a detailed block diagram depicting a switching control unit of circuit breaker according to Embodiment 12 of the present invention.
Figure 17:
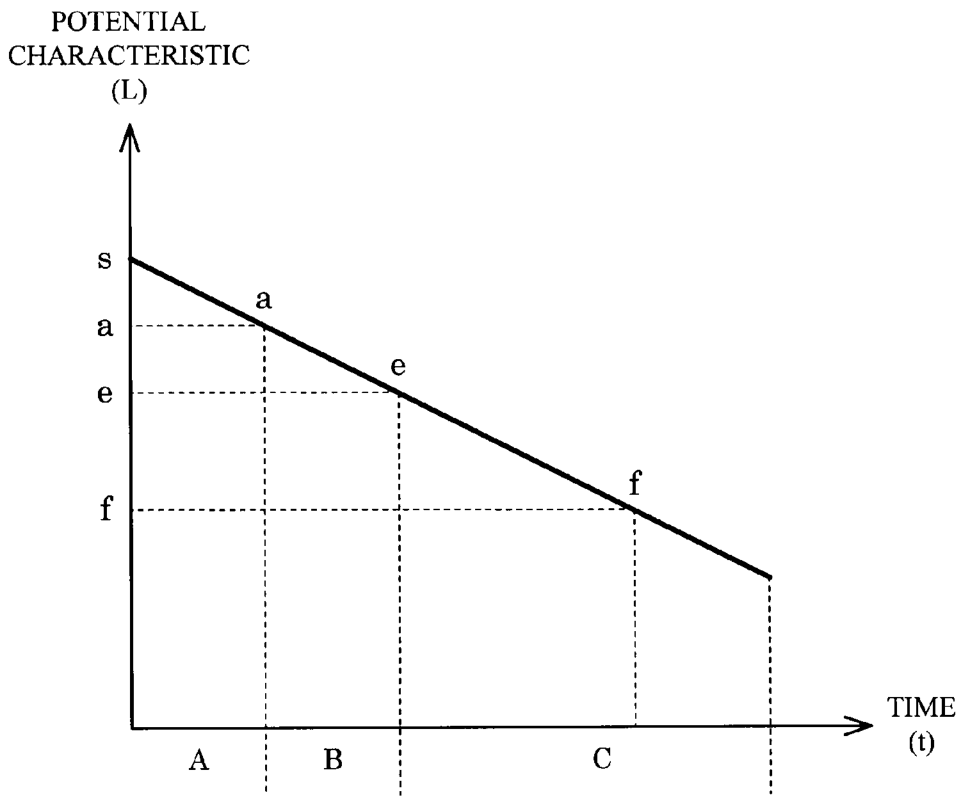
FIG. 17 is a potential deterioration failure model for describing functions according to Embodiment 12 of the present invention.

The system configuration of Embodiment 12 is similar to the above mentioned Embodiment 1, Embodiment 2 and Embodiment 3, so FIG. 16 shows FIG. 2 from which portions unnecessary to described Embodiment 12 are omitted.

As the detailed block diagram of the switching control unit of circuit breaker 100 in FIG. 14 shows, a configuration characteristic of Embodiment 12 is that a circuit breaker state quantity monitoring processing (circuit breaker state quantity monitoring means) 215, which is a software for detecting that the circuit breaker state quantity deviated from a predetermined range, is installed in the switching control operation MPU 210 of the switching control arithmetic operation unit 200 of the switching control unit of circuit breaker 100. A state quantity corresponding to current value data, such as gas pressure, oil pressure, circuit breaker operation time, and circuit breaker stroke curve, and state quantity corresponding to cumulative value data, such as circuit breaker contact erosion quantity, are input to the circuit breaker state quantity monitoring processing 215, and a monitoring result to show whether the circuit breaker state quantity deviated from a predetermined value or not is output.

(Function)

The function of Embodiment 12 will now be described with reference to the potential deterioration failure model graph in FIG. 17.

In the process of manifesting accident phenomena, it is desirable to discover an abnormality in an alarm area B from point a to point e, since [the abnormality] deteriorates while accelerating after point f, quickly reaching accident phenomena. The reason is as follows.

Various abnormalities progress over a long period of time as physical phenomena, and it takes time from alarm area B to point f. Even if an abnormality occurs and is detected in the alarm area B, urgent processing, such as an emergency stop, is unnecessary, and a recovery time based on a spontaneous stop can be taken, and accident expansion, such as primary to secondary damage of accident phenomena, does not occur, and repair locations can be limited to minimal areas.

Two types of data are used as the state quantity to indicate the potential characteristic L, that is, a current value data, such as current physical quantity and chemical quantity, and cumulative value data, which is cumulative values of the physical quantity and chemical quantity from the past.

Among the state quantities of the circuit breaker, the state quantity corresponding to the current value data includes gas pressure, oil pressure, circuit breaker operation time and circuit breaker stroke curve, and the state quantity corresponding to the cumulate value data includes circuit breaker contact erosion quantity.

The circuit breaker state quantity monitoring processing 215 monitors whether the state quantity corresponding to the current value data, such as gas pressure, oil pressure, circuit breaker operation time and circuit breaker stroke curve acquired by the switching command control unit 400 deviated from a predetermined range or not, and outputs the result to the DPRAM 30. [The circuit breaker state quantity monitoring processing 215] also monitors whether the state quantity corresponding to the cumulative value data, such as circuit breaker contact erosion quantity, calculated by the contact erosion quantity calculation processing 214 deviated from a predetermined range or not, and outputs the result to the DPRAM 30.

The communication processing operation unit 300 stores the circuit breaker state quantity monitoring result by the circuit breaker state quantity monitoring processing 215 in the FROM 340. The operator can refer to the monitoring result of the circuit breaker state quantity using the display operation unit 700 as an HMI.

(Advantageous Effect)

Detection indicating that the state quantity of the circuit breaker deviated from a predetermined range is not performed by conventional switching control system of circuit breakers, but is detected by another device or unit.

The switching control system of circuit breaker of Embodiment 12, on the other hand, has this function, and another device or unit need not be combined. Hence a compact and inexpensive switching control system of circuit breaker that can be easily used can be provided.

The invention claimed is:

1. A switching control system of circuit breaker, comprising:

one or more switching control units of circuit breaker each of which inputs electrical quantity of at least one of power system voltage and main circuit current, state quantity of a circuit breaker, and at least one of an opening command signal and closing command signal of the circuit breaker, and performs control to cause the circuit breaker to open or close at a desired phase of the power system voltage or main circuit current; and a display operation unit, which is connected with the switching control unit of circuit breaker via a communication network and performs display operation to operate and monitor the operation and state of the switching control unit of circuit breaker, characterized in that:

the switching control unit of circuit breaker comprises:

a first area serving as switching control arithmetic operation means for causing the circuit breaker to open or close at a desired phase of the power system voltage or main circuit current; and a second area serving as communication arithmetic operation means for transmitting/receiving information from the display operation unit or transmitting information of the first area, via the communication network, wherein the switching control arithmetic operation of the first area can be executed independently from the communication arithmetic operation of the second area for the communication network by disposing information transfer means between the first area and the second area, and the switching control unit of circuit breaker further comprises:

a third area serving as switching command control means, which is connected with the first area via a parallel transmission medium, and outputs a delay-controlled opening command signal or a delay-controlled closing command signal to the circuit breaker based on a switching control arithmetic operation result of the first area;

a semiconductor switch circuit for circuit breaker switching control in which a plurality of semiconductor switches for circuit breaker switching control are connected, in order to output a delay-controlled opening command signal or a delay-controlled closing command signal to the circuit breaker in the third area;

a bypass circuit which is connected in parallel with the semiconductor switch circuit for circuit breaker switching control; and a bypass circuit selector switch which prevents current from simultaneously flowing into the semiconductor switch circuit for circuit breaker switching control and the bypass circuit, wherein the bypass circuit selector switch selects the bypass circuit side when an abnormality is detected in the switching control unit of circuit breaker, or when a bypass circuit change-over command signal from the outside is input.

2. The switching control system of circuit breaker according to claim 1, wherein the third area serving as the switching command control means has a hardware counter for controlling the delay of an opening command signal or closing command signal, and the hardware counter operates based on a same timing clock as the switching control arithmetic operation of the first area serving as the switching control arithmetic operation means.

3. The switching control system of circuit breaker according to claim 1, wherein at least one of the switching control unit of circuit breaker and the display operation unit has wireless communication means, and all or a part of the communication network which transmits/receives information between the switching control unit of circuit breaker and the display operation unit is a wireless communication network.

4. The switching control system of circuit breaker according to claim 1, wherein a web server is installed in the second area serving as communication arithmetic operation means.

5. The switching control system of circuit breaker according to claim 1, wherein a web browser is installed in the display operation unit, and display operation for operating and monitoring the operation and state of the switching control unit of circuit breaker is executed via the web browser.

6. The switching control system of circuit breaker according to claim 1, wherein the switching control unit of circuit breaker has a plurality of operation modes, and has a plurality of data storage areas separated for each of the operation modes in the second area serving as the communication arithmetic operation means.

7. The switching control system of circuit breaker according to claim 1, wherein the switching control unit of circuit breaker has, in the third area serving as the switching command control means, a semiconductor switch for circuit breaker switching control in order to output a delay-controlled opening command signal or a delay-controlled closing command signal to the circuit breaker, and a plurality of the semiconductor switches for circuit breaker switching control are connected in series.

8. The switching control system of circuit breaker according to claim 1, wherein the switching control unit of circuit breaker has, in the third area serving as the switching command control means, a semiconductor switch for circuit breaker switching control in order to output a delay-controlled opening command signal or a delay-controlled closing command signal to the circuit breaker, and a plurality of the semiconductor switches for circuit breaker switching control are connected in parallel.

9. The switching control system of circuit breaker according to claim 1, wherein the switching control unit of circuit breaker has, in the third area serving as the switching command control means, a semiconductor switch for circuit breaker switching control in order to output a delay-controlled opening command signal or a delay-controlled closing command signal to the circuit breaker, and a plurality of circuits, in which a plurality of the semiconductor switches for circuit breaker switching control are connected in series, are connected in parallel.

10. The switching control system of circuit breaker according to claim 1, wherein the switching control unit of circuit breaker has a bypass circuit change-over command signal input circuit in the third area serving as the switching command control means, wherein the bypass circuit selector switch selects the bypass circuit side when a bypass circuit change-over command signal from the outside is input to the bypass circuit change-over command signal input circuit.

11. The switching control system of circuit breaker according to claim 1, wherein the switching control unit of circuit breaker has a backup battery for a power supply circuit, and the backup battery is connected to the power supply circuit via a reverse-flow prevention circuit.

12. The switching control system of circuit breaker according to claim 1, wherein the switching control unit of circuit breaker has a reignition detection function in the first area serving as the switching control arithmetic operation means, and if the main circuit current continuously flows in a time domain exceeding a target current zero point when a control to open the circuit breaker is performed at a desired phase of the main circuit current, the switching control unit of circuit breaker decides that reignition is generated in the circuit breaker using the reignition detection function.

13. The switching control system of circuit breaker according to claim 1, wherein the switching control unit of circuit breaker has contact erosion quantity calculation means in the first areas as the switching control arithmetic operation means, inputs a signal from a stroke sensor, which outputs a signal corresponding to the position of a circuit breaker contact, and calculates a contact erosion quantity based on the main circuit current and position signal information of the circuit breaker contact when the circuit breaker opens.

14. The switching control system of circuit breaker according to claim 1, wherein the switching control unit of circuit breaker has circuit breaker state quantity monitoring means in the first area serving as the switching control arithmetic operation means, sets a tolerance which is set based on a value at the operation start or an arbitrary setting range for the state quantity of the circuit breaker using the display operation unit, and detects deviation of the state quantity of the circuit breaker from the tolerance which is set based on the value at the operation start or from the arbitrary setting range.

* * * * *